US011563998B2

(12) United States Patent
Otsuka et al.

(10) Patent No.: US 11,563,998 B2
(45) Date of Patent: Jan. 24, 2023

(54) VIDEO DISTRIBUTION SYSTEM FOR LIVE DISTRIBUTING VIDEO CONTAINING ANIMATION OF CHARACTER OBJECT GENERATED BASED ON MOTION OF DISTRIBUTOR USER, VIDEO DISTRIBUTION METHOD, AND VIDEO DISTRIBUTION PROGRAM

(71) Applicant: GREE, Inc., Tokyo (JP)

(72) Inventors: Naohide Otsuka, Tokyo (JP); Takashi Yasukawa, Tokyo (JP); Yousuke Yamanouchi, Tokyo (JP); Yasunori Kurita, Tokyo (JP)

(73) Assignee: GREE, INC., Tokyo (JP)

( * ) Notice: Subject to any disclaimer, the term of this patent is extended or adjusted under 35 U.S.C. 154(b) by 0 days.

(21) Appl. No.: 17/418,524

(22) PCT Filed: Dec. 24, 2019

(86) PCT No.: PCT/JP2019/050682
§ 371 (c)(1),
(2) Date: Jun. 25, 2021

(87) PCT Pub. No.: WO2020/138107
PCT Pub. Date: Jul. 2, 2020

(65) Prior Publication Data
US 2022/0095008 A1 Mar. 24, 2022

(30) Foreign Application Priority Data
Dec. 28, 2018 (JP) .............................. JP2018-248253

(51) Int. Cl.
*H04N 21/45* (2011.01)
*H04N 21/2187* (2011.01)
(Continued)

(52) U.S. Cl.
CPC ......... *H04N 21/4312* (2013.01); *G06T 13/40* (2013.01); *H04N 21/2187* (2013.01);
(Continued)

(58) Field of Classification Search
CPC ........... H04N 21/4312; H04N 21/2187; H04N 21/4532; H04N 21/472; H04N 21/4788;
(Continued)

(56) References Cited

U.S. PATENT DOCUMENTS

2011/0007079 A1* 1/2011 Perez ............... H04N 21/44218
345/473
2017/0289595 A1* 10/2017 Lewis .................. H04N 21/252
(Continued)

FOREIGN PATENT DOCUMENTS

| JP | 2012-120098 A | 6/2012 |
| JP | 2015-184689 A | 10/2015 |
| JP | 2017-187995 A | 10/2017 |

OTHER PUBLICATIONS

International Preliminary Report on Patentability and Written Opinion of the International Searching Authority dated Jul. 8, 2021, issued in corresponding International Application No. PCT/JP2019/050682 with English translation (7 pgs).
(Continued)

*Primary Examiner* — Alazar Tilahun
(74) *Attorney, Agent, or Firm* — Pillsbury Winthrop Shaw Pittman, LLP

(57) ABSTRACT

One aspect of the invention relates to a video distribution system for live distributing a video containing a virtual space and an animation of a character object generated based on a motion of a distributor user. The video distribution system determines, when receiving from a viewer user watching the video a participation request to request participation in the video, which one of first and second groups
(Continued)

the viewer user belongs to. If the viewer user is determined to belong to the first group, the video distribution system arranges a specific avatar of the viewer user in a first region within the virtual space. If the viewer user is determined to belong to the second group, the video distribution system arranges the specific avatar in a second region within the virtual space as long as a condition for participation is satisfied.

20 Claims, 14 Drawing Sheets

(51) Int. Cl.
    *H04N 21/431*     (2011.01)
    *H04N 21/4788*     (2011.01)
    *H04N 21/472*     (2011.01)
    *G06T 13/40*     (2011.01)

(52) U.S. Cl.
    CPC ....... *H04N 21/4532* (2013.01); *H04N 21/472* (2013.01); *H04N 21/4788* (2013.01)

(58) Field of Classification Search
    CPC .. H04N 21/258; H04N 21/8146; G06T 13/40; G06T 1/00; G06T 19/00; G06T 17/00; G06T 13/00; G06T 15/00; G06T 2211/00
    See application file for complete search history.

(56) References Cited

U.S. PATENT DOCUMENTS

2018/0028916 A1*   2/2018   Chen .................... A63F 13/847
2018/0262717 A1*   9/2018   Imaoka ................. G06Q 50/10

OTHER PUBLICATIONS

International Search Report dated Feb. 18, 2020, issued in corresponding International Patent Application No. PCT/JP2019/050682 with English translation (5 pgs.).

Written Opinion of the International Searching Authority dated Feb. 18, 2020, issued in corresponding International Patent Application No. PCT/JP2019/050682 (4 pgs.).

Yusuke Hasegawa, Opening of virtual idle new time. Project MariA, CG World, Japan, Born Digital, Inc., Nov. 10, 2017, vol. 231, pp. 74-79, (relevance disclosed in paragraph [0002] of the specification as filed).

* cited by examiner

User Data

| Account Information | Avatar Information | Group Information |
|---|---|---|
| User ID | Avatar ID | Group ID |

Fig. 3

Avatar Data

| Avatar Identification Information | Avatar Display Information |
|---|---|
| Avatar ID | Part Information (Head, Outfits, Accessories, etc.) |

Fig. 4

Participation Management Data

| Video Identification Information | Participation Limiting Information | Participating Avatar |
|---|---|---|
| Video ID | Upper Limit | Avatar ID |

VIDEO DISTRIBUTION SYSTEM FOR LIVE DISTRIBUTING VIDEO CONTAINING ANIMATION OF CHARACTER OBJECT GENERATED BASED ON MOTION OF DISTRIBUTOR USER, VIDEO DISTRIBUTION METHOD, AND VIDEO DISTRIBUTION PROGRAM

CROSS-REFERENCE TO RELATED APPLICATIONS

This application is based on and claims the benefit of priority from International Application No. PCT/JP2019/050682 (filed Dec. 24, 2019), which claims priority to Japanese Patent Application Serial No. 2018-248253 (filed on Dec. 28, 2018), the contents of each of which are incorporated herein by reference in their entirety.

TECHNICAL FIELD

The present disclosure relates to a video distribution system, a video distribution method, and a storage medium storing thereon video distribution program, for live distributing a video containing an animation of a character object generated based on motion of a distributor user.

BACKGROUND

Video distribution systems have been known that generate an animation of a character object based on motion of a distributor user and live distribute a video including the animation of the character object. Such video distribution systems are disclosed, for example, in Japanese Patent Application Publication No. 2015-184689 (Patent Literature 1) and "Hasegawa Yusuke, Beginning of New Era of Virtual Idle, PROJECT MariA, CG WORLD, Japan, Bone Digital Co., Ltd., Nov. 10, 2017, Vol. 231, pp. 74-79."

As disclosed in Japanese Patent Application Publication No. 2012-120098 (Patent Literature 2), another video distribution system is also known that, in response to a request from a viewer user watching a video, can cause an image containing an avatar of the viewer user to be displayed in a background region of the video being distributed. The viewer user is able to post his/her comment via the avatar on the video. In this manner, the viewer user can use his/her avatar to participate in the video being distributed.

Japanese Patent Application Publication No. 2017-187995 (Patent Literature 3) discloses a social media system that enables a plurality of users to make voice communication using avatar images staying in a virtual room. The social media system disclosed in this Publication imposes an upper limit on the number of avatars that are allowed to stay in each room. When an entry request is made for a certain room, the entry request is granted if the number of avatars that are already in the room does not exceed the upper limit imposed on the room. If the entry request for the room is granted, a new avatar is permitted to enter the room.

RELEVANT REFERENCES

List of Relevant Patent Literature

Patent Literature 1: Japanese Patent Application Publication No. 2015-184689
Patent Literature 2: Japanese Patent Application Publication No. 2012-120098
Patent Literature 3: Japanese Patent Application Publication No. 2017-187995

List of Relevant Non-Patent Literature

Non-Patent Literature 1: Hasegawa Yusuke, Beginning of New Era of Virtual Idle, PROJECT MariA, CG WORLD, Japan, Bone Digital Co., Ltd., Nov. 10, 2017, Vol. 231, pp. 74-79., Ltd., Nov. 10, 2017, Vol. 231, pp. 74-79."

SUMMARY

Video distribution systems encounter the problem of high processing load required to display a large number of avatars if an unlimited number of avatars are permitted to participate in a video being distributed. In addition, an increased number of avatars may disadvantageously result in increased processing load for comment posting and gifting via the avatars. Too high processing load relating to the behaviors of the avatars may hinder playback of distributed videos and normal provision of communicating functions using the avatars.

On the other hand, if the distribution systems allow only a limited number of avatars to participate in the video being distributed, this may prevent participation of viewer users who are highly engaged with the distribution systems or the distributor user responsible for the distribution of the video. For the video distribution system, it is considered important to acquire and keep highly engaged viewer users for the purposes of achieving more vigorous community involving the distributor and viewer users and managing the community in a sound manner.

It is an object of the present disclosure to provide a technical improvement which solves or alleviates at least part of the drawbacks of the prior art mentioned above. In particular, one object of the disclosure is to provide a video distribution system, a video distribution method and a video distribution program, capable of reducing an increase in processing load caused by participation of avatars while avoiding rejection of participation request made by highly engaged viewer users.

One aspect of the invention relates to a video distribution system for live distributing a video containing a virtual space and an animation of a character object generated based on motion of a distributor user. The video distribution system includes one or more computer processors. The one or more computer processors execute computer-readable instructions to determine, when receiving from a viewer user watching the video a participation request to request participation in the video, which one of first and second groups the viewer user belongs to, to arrange, if the viewer user is determined to belong to the first group, a specific avatar of the viewer user in a first region within the virtual space, and to arrange, if the viewer user is determined to belong to the second group, the specific avatar in a second region within the virtual space as long as a condition for participation is satisfied.

In one embodiment, in the virtual space, the first region is closer to the character object than is the second region.

In one embodiment, the condition for participation is defined such that the number of avatars displayed in the second region and representing users other than the viewer user is less than an upper limit on a displayable number set for the second region.

In one embodiment, the condition for participation is defined such that the viewer user is selected by the distributer user.

The video distribution system relating to one embodiment further includes a storage for storing therein avatar data used to display the specific avatar in the virtual space and displays the specific avatar in the virtual space based on the avatar data read from the storage.

The video distribution system relating to one embodiment receives a motion instruction targeting the specific avatar arranged in the virtual space, and controls motion of the specific avatar displayed in the virtual space based on the motion instruction.

The video distribution system relating to one embodiment receives a display request targeting the specific avatar while the specific avatar is arranged in the virtual space, and, if the display request is approved, displays the specific avatar in a third region where the character object is arranged.

In one embodiment, the specific avatar is arranged in the third region if the viewer user is selected by the distributor user after the display request targeting the specific avatar is received.

In another aspect of the invention, provided is a video distribution method performed by one or more computer processors executing computer-readable instructions to live distribute a video containing an animation of a character object generated based on motion of a distributor user. The video distribution method includes steps of determining, when receiving from a viewer user watching the video a participation request to request participation in the video, which one of first and second groups the viewer user belongs to, arranging, if the viewer user is determined to belong to the first group, a specific avatar of the viewer user in a first region within the virtual space, and arranging, if the viewer user is determined to belong to the second group, the specific avatar in a second region within the virtual space as long as a condition for participation is satisfied.

In yet another aspect of the invention, provided is a video distribution program for live distributing a video containing an animation of a character object generated based on motion of a distributor user. The video distribution program causes one or more computer processors to determine, when receiving from a viewer user watching the video a participation request to request participation in the video, which one of first and second groups the viewer user belongs to, to arrange, if the viewer user is determined to belong to the first group, a specific avatar of the viewer user in a first region within the virtual space, and to arrange, if the viewer user is determined to belong to the second group, the specific avatar in a second region within the virtual space as long as a condition for participation is satisfied.

Advantageous Effects

An embodiment of the present invention can reduce an increase in processing load caused by participation of avatars while avoiding rejection of participation request made by highly engaged viewer users.

BRIEF DESCRIPTION OF THE DRAWINGS

FIG. 3 illustrates user data stored in the video distribution system of FIG. 1.

FIG. 4 illustrates avatar data stored in the video distribution system of FIG. 1.

FIG. 5 illustrates participation management data stored in the video distribution system of FIG. 1.

DESCRIPTION OF THE PREFERRED EMBODIMENTS

Figure 1:
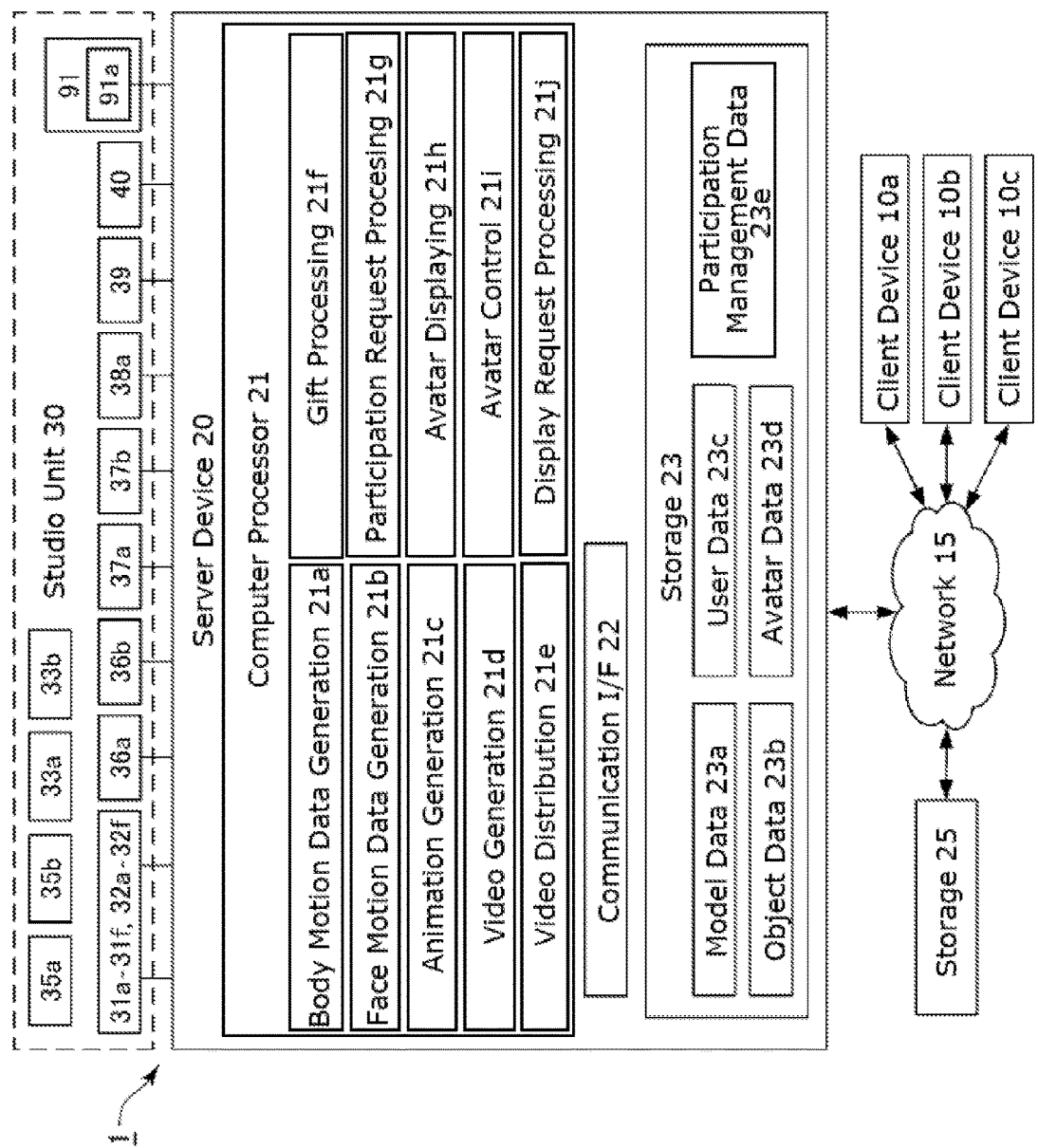
FIG. 1 is a block diagram illustrating a video distribution system in one embodiment.

Various embodiments of the disclosure will be described hereinafter with reference to the accompanying drawings. Throughout the drawings, the same or similar elements are denoted by the same reference numerals.

Figure 2:
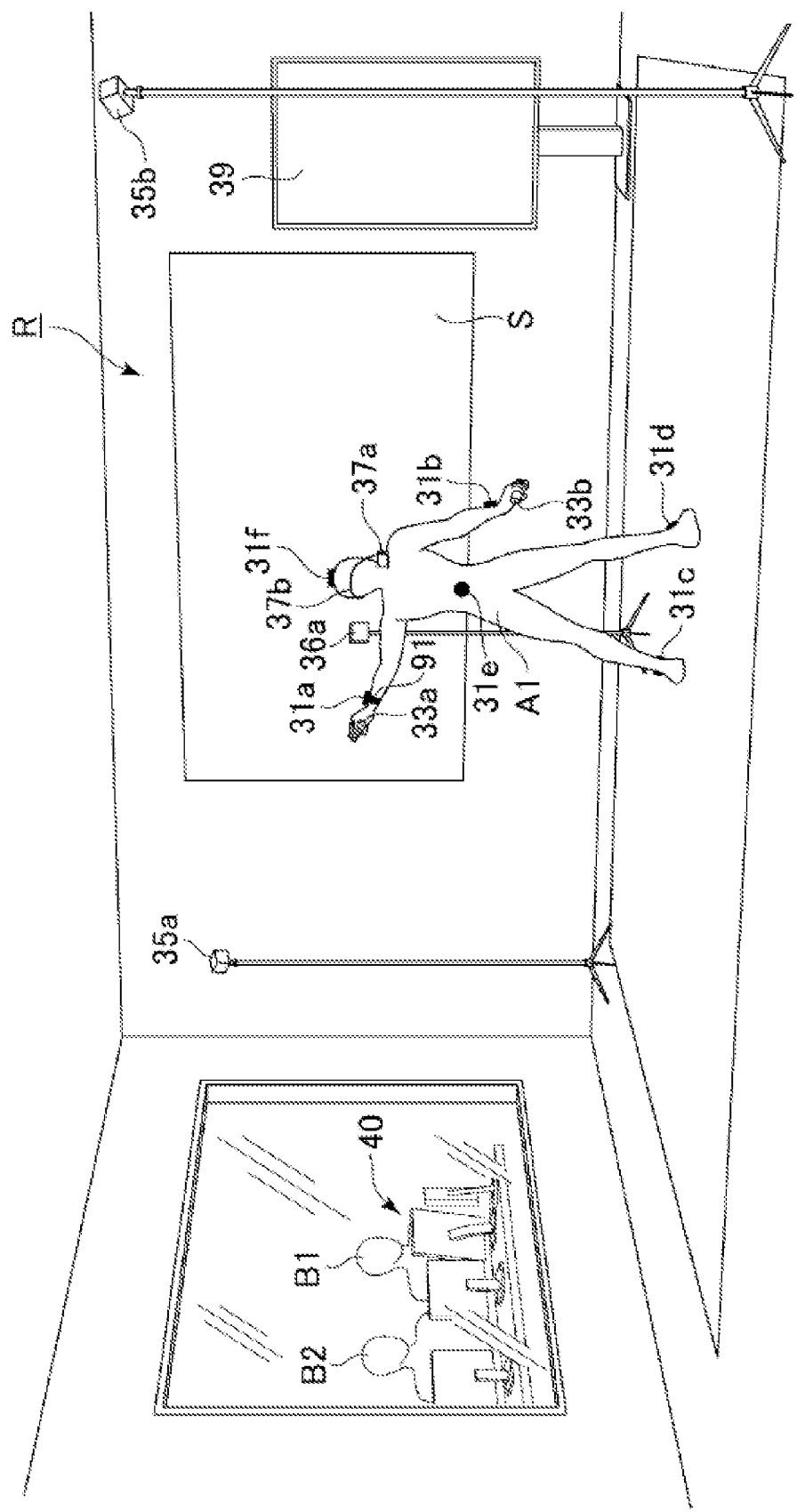
FIG. 2 schematically illustrates an installation of a studio where a video to be distributed in the video distribution system of FIG. 1 is produced.
Figure 6:
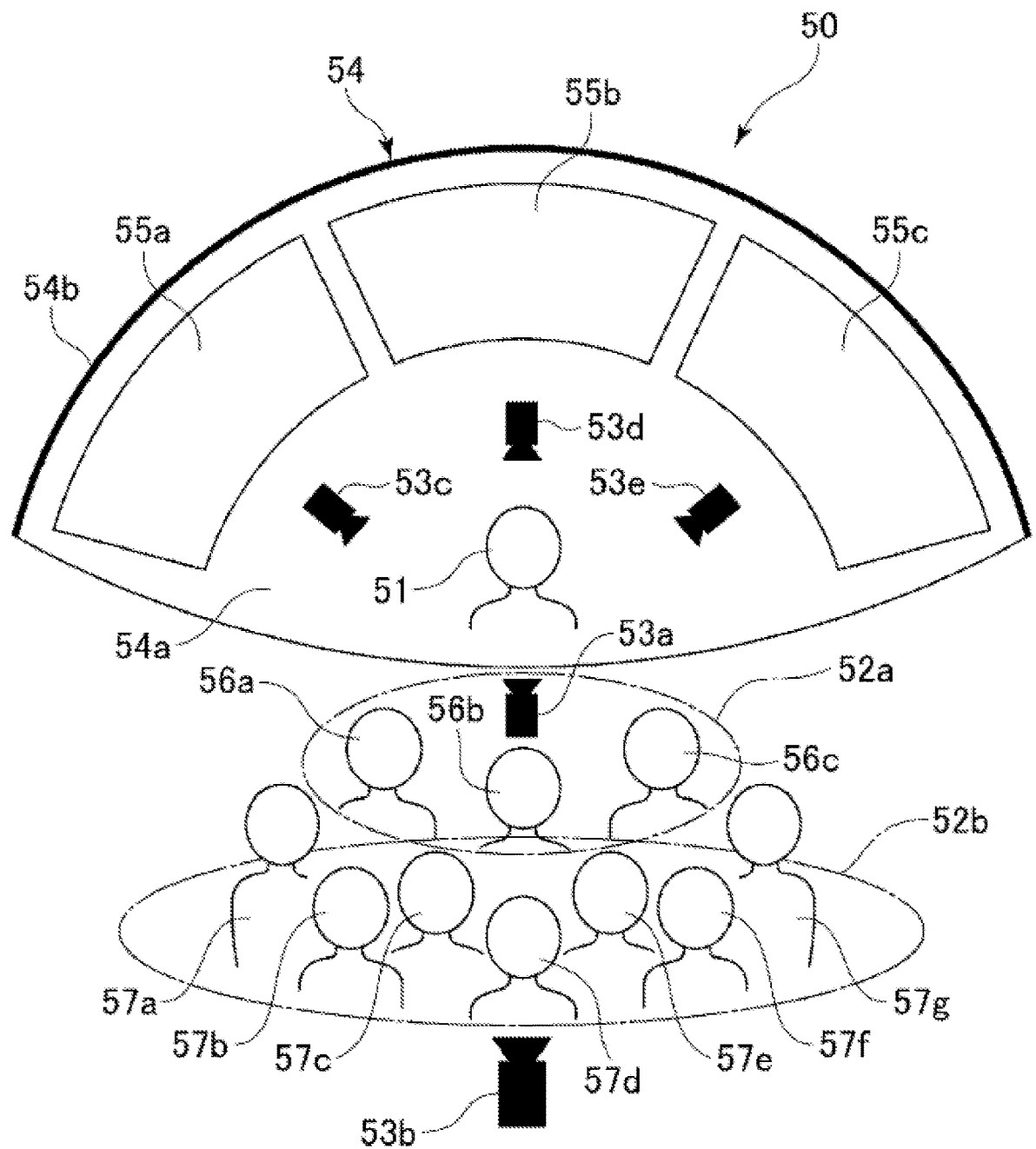
FIG. 6 is used to illustrate a virtual space displayed in a video distributed in the video distribution system of FIG. 1.

With reference to FIGS. 1 to 6, a video distribution system according to an embodiment will be described. FIG. 1 is a block diagram illustrating a video distribution system 1 according to one embodiment, FIG. 2 schematically illustrates an installation of a studio where a video to be distributed in the video distribution system 1 is produced, FIGS. 3 to 5 are used for describing the information stored in the video distribution system 1, and FIG. 6 schematically shows a virtual space displayed in a video.

The video distribution system 1 includes client devices 10a to 10c, a server device 20, a studio unit 30, and a storage 25. The client devices 10a to 10c, the server device 20, and the storage 25 are communicably interconnected over a network 15. The server device 20 is configured to distribute a video including an animation of a character, as described later. The character included in the video may be motion-controlled in a virtual space.

The video may be distributed from the server device 20 to each of the client devices 10a to 10c. A first viewer user who is a user of the client device 10a, a second viewer user who is a user of the client device 10b, and a third viewer user who is a user of the client device 10c are able to watch the distributed video with their respective client devices. The video distribution system 1 may include less than three client devices, or may include more than three client devices. Viewer users collectively refer to the users who use the client devices 10a to 10c and other client devices to watch the video distributed from the server device 20. The users may watch the video distributed from the server device 20 through the client devices 10*a* to 10*c*, where application software enabling the users to view the video is executable. To watch the video distributed from the server device 20, the users may, onto the client devices 10*a* to 10*c*, download and install application software including a set of instructions implementing the video viewing function. The application software providing the function of watching the video distributed from the server device 20 may be referred to as "watching application software" or "watching app." The users may watch the video distributed from the server device 20 by executing the functions of the watching app. In one embodiment, the users may watch the video distributed from the server device 20 on one or more of the client devices 10*a* to 10*c* that has the watching app installed therein and may not be able to watch the video on one or more of the client devices 10*a* to 10*c* without the watching app being installed. The viewer user watching the video distributed from the server device 20 can have his/her avatar displayed in the video. In other words, the viewer user can use his/her avatar to participate in the video being distributed. The viewer user can have his/her avatar displayed in the video being distributed and use the displayed avatar to interact with the distributer user of the video (or the character in the video being distributed) and with other viewer users.

The client devices 10*a* to 10*c* are information processing devices such as smartphones. In addition to the smartphone, the client devices 10*a* to 10*c* each may be a mobile phone, a tablet, a personal computer, an electronic book reader, a wearable computer, a game console, or any other information processing devices that are capable of playing videos. Each of the client devices 10*a* to 10*c* may include a computer processor, a memory unit, a communication I/F, a display, a sensor unit including various sensors such as a gyro sensor, a sound collecting device such as a microphone, and a storage for storing various information.

The display of the client devices 10*a* to 10*c* includes a display panel and a touch-screen panel. The touch-screen panel is configured to detect touch interactions (touch operations) performed by a user. The touch-screen panel is capable of detecting various touch operations such as tapping, double tapping, and dragging performed by the user. The touch-screen panel may include a capacitive proximity sensor and may be capable of detecting a non-contact operation performed by the user.

Viewer users can input a message regarding the distributed video or other messages via the respective touch-screen panels of the client devices 10*a* to 10*c*. The message may be, for example, a text message, a still image message, a moving image message, and any other electronic message. Each of the client devices 10*a* to 10*c* may be configured to post (send) the message input by the viewer user to the server device 20.

In the illustrated embodiment, the server device 20 includes a computer processor 21, a communication I/F 22, and a storage 23.

The computer processor 21 is a computing device which loads an operating system and various programs realizing various functions from the storage 23 or other storage into a memory unit and executes instructions included in the loaded programs. The computer processor 21 is, for example, a CPU, an MPU, a DSP, a GPU, any other computing device, or a combination thereof. The computer processor 21 may be realized by means of an integrated circuit such as ASIC, PLD, FPGA, MCU, or the like. Although the computer processor 21 is illustrated as a single component in FIG. 1, the computer processor 21 may be a collection of a plurality of physically separate computer processors. In this specification, a program or instructions included in the program that are described as being executed by the computer processor 21 may be executed by a single computer processor or executed by a plurality of computer processors in a distributed manner. Further, a program or instructions included in the program executed by the computer processor 21 may be executed by a plurality of virtual computer processors. The computer processor 21 realizes a plurality of functions, which will be described below.

The communication I/F 22 may be implemented as hardware, firmware, or communication software such as a TCP/IP driver or a PPP driver, or a combination thereof. The server device 20 is able to transmit and receive data to and from other devices via the communication I/F 22.

The storage 23 is a storage device accessible by the computer processor 21. The storage 23 is, for example, a magnetic disk, an optical disk, a semiconductor memory, or various other storage devices capable of storing data. Various programs may be stored in the storage 23. At least some of the programs and various data that may be stored in the storage 23 may be stored in a storage (for example, a storage 25) that is physically separated from the server device 20. The data stored in the storage 23 will be described below in detail.

Most of components of the studio unit 30 are disposed, for example, in a studio room R shown in FIG. 2. As illustrated, an actor A1 gives performance in the studio room R. The studio unit 30 is configured to detect motions and facial expressions of the actor A1 and to output the detected information to the server device 20.

The actor A1 is an object whose motions and facial expressions are captured by a group of sensors provided in the studio unit 30, which will be described later. In the illustrated embodiment, the actor A1 is a human who talks, gives a performance, and performs other actions for advancing a program distributed as the video. The actor A1 may be an animal or any other moving (non-living) object, if not a human. The actor A1 may be, for example, an autonomous robot. The number of actors in the studio room R may be one or three or more.

The studio unit 30 includes six motion sensors 31*a* to 31*f* attached to the actor A1, a controller 33*a* held by the left hand of the actor A1, a controller 33*b* held by the right hand of the actor A1, a camera 37*a* attached to the head of the actor A1 via an attachment 37*b*, and a wristwatch-type actor device 91 worn on the left arm of the actor A1. A microphone for collecting audio data may be provided to the attachment 37*b*. The microphone can collect speeches of the actor A1 as audio data. The microphone may be a wearable microphone attached to the actor A1 via the attachment 37*b*. Alternatively, the microphone may be installed on the floor, wall or ceiling of the studio room R. In addition to the components described above, the studio unit 30 further includes a base station 35*a*, a base station 35*b*, a digital camera 36*a* and a display 39. A supporter computer 40 is installed in a room next to the studio room R, and these two rooms are separated from each other by a glass window. The server device 20 may be installed in the same room as the supporter computer 40.

The motion sensors 31*a* to 31*f* cooperate with the base station 35*a* and the base station 35*b* to detect their position and orientation. In one embodiment, the base station 35*a* and the base station 35*b* are multi-axis laser emitters. The base station 35*a* emits flashing light for synchronization and then emits a laser beam about, for example, a vertical axis for scanning. The base station 35*b* emits a laser beam about, for example, a horizontal axis for scanning. Each of the motion sensors 31*a* to 31*f* may be provided with a plurality of optical sensors for detecting incidence of the flashing lights and the laser beams from the base station 35*a* and the base station 35*b*, respectively. The motion sensors 31*a* to 31*f* each may detect its position and orientation based on a time difference between an incident timing of the flashing light and an incident timing of the laser beam, time when each optical sensor receives the light and or beam, an incident angle of the laser light detected by each optical sensor, and any other information as necessary. The motion sensors 31*a* to 31*f* may be, for example, Vive Trackers provided by HTC CORPORATION. The base station 35*a* and the base station 35*b* may be, for example, base stations provided by HTC CORPORATION.

Detection result information about the position and the orientation of each of the motion sensors 31*a* to 31*f* that are estimated in the corresponding motion sensor is transmitted to the server device 20. The detection result information may be wirelessly transmitted to the server device 20 from each of the motion sensors 31*a* to 31*f*. Since the base station 35*a* and the base station 35*b* emit flashing light and a laser light for scanning at regular intervals, the detection result information of each motion sensor is updated at each interval. Three or more base stations may be provided. The position of the base station may be changed as appropriate. For example, in addition to or instead of the base stations shown in FIG. 2 disposed at the upper corners of the space to be detected by the tracking sensor, a pair of the base stations may be disposed at an upper position and a lower position close to the floor. For example, there may be four base stations.

In the illustrated embodiment, the six motion sensors 31*a* to 31*f* are mounted on the actor A. The motion sensors 31*a*, 31*b*, 31*c*, 31*d*, 31*e*, and 31*f* are attached to the back of the left hand, the back of the right hand, the left instep, the right instep, the hip, and top of the head of the actor A1, respectively. The motion sensors 31*a* to 31*f* may each be attached to the actor A1 via an attachment. The motion sensors 31*a* to 31*f* shown in FIG. 2 are merely an example. The motion sensors 31*a* to 31*f* may be attached to various body parts of the actor A1. The number of motion sensors attached to the actor A1 may be equal to or less than 5, or equal to or more than 7. As described above, body motions of the actor A1 are detected by detecting the position and the orientation of the motion sensors 31*a* to 31*f* attached to the body parts of the actor A1. Body motions of the actor A1 may be detected by an optical motion capture system.

In one embodiment, a plurality of infrared LEDs are mounted on each of the motion sensors attached to the actor A1, and light from the infrared LEDs are sensed by infrared cameras provided on the floor and/or wall of the studio room R to detect the position and the orientation of each of the motion sensors. Visible light LEDs may be used instead of the infrared LEDs, and in this case light from the visible light LEDs may be sensed by visible light cameras to detect the position and the orientation of each of the motion sensors. As described above, a light emitting unit (for example, the infrared LED or visible light LED) may be provided in each of the plurality of motion sensors attached to the actor, and a light receiving unit (for example, the infrared camera or visible light camera) provided in the studio room R senses the light from the light emitting unit to detect the position and the orientation of each of the motion sensors.

In one embodiment, a plurality of reflective markers may be used instead of the motion sensors 31*a*-31*f*. The reflective markers may be attached to the actor A1 using an adhesive tape or the like. The position and orientation of each reflective marker can be estimated by capturing images of the actor A1 to which the reflective markers are attached to generate captured image data and performing image processing on the captured image data. In one embodiment, the body motions of the actor A1 may be detected using a suit having inertia sensors embedded therein. The body motions of the actor A1 can be detected by analyzing sensor signals output from the inertia sensors of the inertia-sensor-embedded-suit worn by the actor A1. The inertia-sensor-embedded-suit can be an inertia-sensor-embedded-suit compatible with MVN or a motion capture system developed by Xsens.com.

The controller 33*a* and the controller 33*b* supply, to the server device 20, control signals that correspond to operation of the actor A1.

The digital camera 36*a* captures images of the actor A1 and generates captured image data. The position, image capturing direction, and angle of view of the digital camera 36*a* are set in accordance with operation of the operator. The digital camera 36*a* transmits image-capturing configuration information that includes the position, image capturing direction, and angle of view of the digital camera 36*a*, to the server device 20. Similarly, the position, image capturing direction, and an angle of view of the digital camera 36*b* are set in accordance with operation of the operator. In the illustrated embodiment, the digital camera 36*a* is disposed on the left front of the actor A1.

The camera 37*a* is attached to the head of the actor A1 as described above. For example, the camera 37*a* is disposed so as to capture an image of the face of the actor A1. The camera 37*a* captures successive images of the face of the actor A1 to obtain captured image data of the face of the actor A1. The camera 37*a* transmits the captured image data of the face of the actor A1 to the server device 20. The camera 37*a* may be a 3D camera capable of sensing the depth of a face of a human. The camera 37*a* may be, for example, a LIDAR device built in iPhone X (registered trademark) provided by Apple Inc. The iPhone X (registered trademark) may be attached to, for example, a headgear worn on the head of the actor A1. The camera 37*a* may be fixed to a camera stand installed in the studio room R, instead of being mounted on the actor A1.

The display 39 is configured to display information received from the support computer 40. The information transmitted from the support computer 40 to the display 39 may include, for example, text information, image information, and various other information. The display 39 is positioned such that the actor A1 is able to see the display 39.

The actor device 91 is configured to generate a stimulus the actor A1 can perceive, in response to a drive signal from the server device 20. The stimulus is not a sound. If the actor device 91 generates a sound, the sound may be included in contents to be distributed. For this reason, the actor device 91 is configured to generate a stimulus other than a sound. The actor device 91 is capable of generating a stimulus other than an auditory stimulus (typically a sound), for example, a tactile stimulus, a visual stimulus, or any other stimulus that can be perceived by the actor A1 and that is not an auditory stimulus. The actor device 91 may include an actuator 91*a*. The actuator 91*a* is configured to be actuated in accordance with a drive signal from the server device 20. The actuator 91*a* may be configured to vibrate when the drive signal is supplied thereto. For example, Apple Watch provided by Apple Inc. may be used as the actor device 91. The actor device 91 may be formed in various forms and shapes other than the wristwatch form. The actor A1 can wear two or more actor devices 91 of the same types or different types from each other. The actor device 91 may be configured to operate in response to a drive signal from a device other than the server device 20. Two or more actor devices 91 may be associated with the actor ID that identifies the actor A1. The actor device 91 is able to transmit a tactile stimulus to the actor A1 via the actuator 91a. The actor device 91 may be an LED (Light Emitting Diode) or a perceptual display device. LEDs and perceptual display devices can generate visual stimuli. The perceptual display device may be an electrotactile display that drives nerve axons under the skin with current flowing from its electrode.

In the illustrated embodiment, the supporter computer 40 is installed in the next room of the studio room R. Since the room in which the supporter computer 40 is installed and the studio room R are separated by the glass window, an operator of the supporter computer 40 (sometimes referred to as "supporter" in the specification) is able to see the actor A1. In the illustrated embodiment, supporters B1 and B2 are present in the room as the operators of the supporter computer 40.

The supporter computer 40 may be configured to be capable of changing the setting(s) of the component(s) of the studio unit 30 according to the operation by the supporter B1 and the supporter B2. The supporter computer 40 can change, for example, the interval of the scanning performed by the base station 35a and the base station 35b, the position or orientation of the digital camera 36a and the tracking sensor 36b, and various settings of other devices. Switching of active sensor(s), which will be described below, may be performed by the supporters B1 and B2 operating the supporter computer 40. At least one of the supporter B1 and the supporter B2 is able to input a message to the supporter computer 40, and the input message is displayed on the display 39.

The components and functions of the studio unit 30 shown in FIG. 2 are merely example. The studio unit 30 applicable to the invention may include various constituent elements that are not shown. The studio unit 30 may include a projector. The projector is able to project a video distributed to the client device 10a or another client device on the screen S.

On the other hand, shooting for generating a video to distribute may be performed by simpler equipment. For example, by an information processing terminal such as a smartphone, face motion data, which is a digital representation of the actor's facial movements, may be generated and then an animation of a character object whose body stays still but its face moves in synchronization with the actor's facial expression may be generated based on the face motion data. Such face motion data may be generated by the client devices 10a to 10c. To generate the face motion data, the user may, onto the client devices 10a to 10c, download and install application software including a set of instructions implementing the functions necessary to generate the face motion data. The application software implementing the functions necessary to generate the face motion data may be referred to as the "distributing application software" or "distributing app." The distributing app may be different application software from the above-described watching app, or a single piece of application software may have both the distributing app's functions and the above-described watching app's functions. The face motion data may include tracking data concerning the posture of the actor's head, feature points that are digital representations of feature points of the actor's face, and blend face data representing deformation rates of the feature points. An information processing terminal such as a smartphone may generate an image of the actor's face where the facial expression is exaggerated based on the face motion data, and may display the generated image such that the image is superimposed on the face of the character object. When an animation of a character object is generated based on face motion data, the motion sensors 31a, 31b, 31c, 31d, 31e, and 31f, the base stations 35a and 35b, and the digital cameras 36a and 36b for detecting movements of the actor's body are not required so that the animation of the character object can be generated with simpler equipment. If the motion sensors 31a, 31b, 31c, 31d, 31e, and 31f, the base stations 35a and 35b, and the digital camera 36a are not required, generation of a character object can be performed in any places in addition to the studio room R, for example, at the actor's home. Therefore, convenience for the users is enhanced.

Next, the information stored in the storage 23 in one embodiment will be described. In the illustrated embodiment, the storage 23 stores model data 23a, object data 23b, user data 23c, avatar data 23d, participation management data 23e, and any other information required for generation and distribution of videos to be distributed.

The model data 23a is model data used for generating an animation of a character. The model data 23a may be three-dimensional model data used for generating three-dimensional animation, or may be two-dimensional model data used for generating two-dimensional animation. The model data 23a includes, for example, rig data (also referred to as "skeleton data") indicating the skeleton of the character, and surface data indicating the shape or texture of the surface of the character. The model data 23a may include two or more different pieces of model data. The pieces of model data may each have different rig data, or may have the same rig data. The pieces of model data may each have different surface data, or may have the same surface data.

The object data 23b includes asset data used for constructing a virtual space in the video. The object data 23b includes data for rendering a background of the virtual space in the video, data for rendering various objects to be displayed in the video, and data for rendering any other objects to be displayed in the video. The object data 23b may include object position information representing the position of each object in the virtual space.

In addition to the above, the object data 23b may include data used for displaying a gift object in the video in response to a display request made by the viewer users of the client devices 10a to 10c. The gift object may include an effect object, a normal object, and a decorative object. The viewer users are able to purchase a desired gift object.

The effect object is an object that affects the impression of the entire viewing screen of the distributed video, for example, an object representing confetti. The object representing confetti may be displayed on the entire viewing screen, which can change the impression of the entire viewing screen. The effect object may be displayed so as to overlap with the character object, but it is different from the decorative object in that it is not displayed in association with a specific portion of the character object.

The normal object is an object functioning as a digital gift given from the viewer user to the actor (for example, the actor A1) or the character in the video, for example, an object resembling a stuffed toy or a bouquet. In one embodiment, the normal object is displayed in a view showing the video such that it does not contact the character object. In one embodiment, the normal object is displayed in the view showing the video such that it does not overlap with the character object. The normal object may be displayed in the virtual space such that it overlaps with an object other than the character object. The normal object may be displayed so as to overlap with the character object, but it is different from the decorative object in that it is not displayed in association with a specific portion of the character object. In one embodiment, when the normal object is displayed such that it overlaps with the character object, the normal object may hide portions of the character object other than the head including the face of the character object but does not hide the head of the character object.

The decorative object is an object to be displayed in the view in association with a specific part of the character object. In one embodiment, the decorative object to be displayed in the view in association with a specific part of the character object is displayed in the view adjacent to the specific part of the character object. In one embodiment, the decorative object to be displayed in the view in association with a specific part of the character object is displayed in the view such that it partially or entirely covers the specific part of the character object.

The decorative object is an object that can be worn by a character object, for example, an accessory (such as a headband, a necklace, an earring, etc.), clothes (such as a T-shirt), a costume, and any other object which can be worn by the character object. The object data 23b corresponding to the decorative object may include wearing position information indicating which part of the character object is associated with the decorative object. The wearing position information of the decorative object may indicate to which part of the character object the decorative object is to be worn. For example, when the decorative object is a headband, the wearing position information of the decorative object may indicate that the decorative object is to be worn on the "head" of the character object. When the decorative object is a T-shirt, the wearing position information of the decorative object may indicate that the decorative object should be worn on the "torso" of the character object.

To each type of gift object, the duration of displaying the gift object may be assigned. In one embodiment, the duration of displaying the decorative object may be set longer than the duration of displaying the effect object and the duration of displaying the normal object. For example, the duration of displaying the decorative object may be set to 60 seconds, while the duration of displaying the effect object may be set to 5 seconds and the duration of displaying the normal object may be set to 10 seconds.

The object data 23b may include a list showing gift objects possessed by users of the video distribution system 1. In this possession list, an object ID for identifying a gift object possessed by a viewer user may be stored in association with account information of the viewer user. The account information of the user is, for example, a user ID identifying the user. The users may include, for example, the first to third viewer users of the client devices 10a to 10c.

As shown in FIG. 3, the user data 23c can include account information of each of the users (for example, the viewer users) of the video distribution system 1, avatar information relating to an avatar used by each user, and group information relating to a group to which each user belongs. In other words, the storage 23 can store therein, in association with the account information of each user of the video distribution system 1, the avatar information relating to the avatar used by the user, the group information relating to the group to which the user belongs and any other information relating to the user. The account information of a user is, for example, a user ID identifying the user. The user ID of the user may be issued when the user signs up for the video service provided by the server device 20 using any one of the client devices 10a to 10c. To benefit from the service provided by the server device 20, a common user ID may be used between when the watching app is used and when the distributing app is used, or different user IDs may be used between when the watching app is used and when the distributing app is used. When different user IDs are used to benefit from the service provided by the server device 20 between when the watching app is used and when the distributing application is used, a single user may be assigned with a user ID to use the watching app (a user ID for viewing) and a user ID to use the distributing app (a user ID for distribution) that are stored in association with each other. The service provided by the server device 20 and received using the watching app is, for example, a service enabling a user to watch the video distributed from the service device 20. The service provided by the server device 20 and received using the distributing app is, for example, a service enabling a user to distribute a video including his/her character object.

The avatar information of a user is, for example, an avatar ID identifying the avatar used by the user in the video distribution system 1. The avatar ID is assigned to the user if the user registers an avatar. The avatar is registered by the user selecting a head, a hair style, an outfit, accessories and any other parts to constitute the avatar. The avatar may be registered using the client devices 10a to 10c having the distributing app installed therein. In other words, the avatar may be registered by executing the functions of the distributing app. In one embodiment, the avatar can be registered using one or more of the client devices 10a to 10c that have the distributing app installed therein and cannot be registered using one or more of the client devices 10a to 10c that do not have the distributing app installed therein. The avatar may be registered through different application software than the distributing application having functions of generating, editing and/or registering avatars (hereinafter, may be referred to as "the avatar generating application"). When the avatar is registered through either the distributing app and/or avatar generating app, an avatar ID identifying the avatar may be assigned, associated with the user ID of the user and managed as part of the user information as described above with reference to FIG. 3. The user can edit the avatar after having registered the avatar. For example, after registering the avatar, the user can edit some or all of the parts of the avatar. For example, even after registering the avatar, the user can change the hair style, belongings and any other parts constituting the avatar.

The group information of a user is a group ID identifying the group to which the user belongs. The users of the video distribution system 1 can belong to one of the groups including, for example, a first group and a second group. The user of the video distribution system 1 belong to either the first or second group. The second group is a group different from the first group. Whether the user belongs to the first or second group can be determined in various manners. The group ID is not necessarily used to determine which one of the first and second groups the user belongs to. As an alternative example, the user data is made up by records configured such that a flag is set in the record of a user belonging to the first group and no flag is set in the record of a user belonging to the second group. In this manner, it can be known which one of the first and second groups a user belongs to. Various criteria may be used to determine which one of the groups a user belongs. For example, users who are relatively highly engaged with the video distribution system 1 can be determined to belong to the first group, and users who are less engaged with the video distribution system 1 can be determined to belong to the second group. The engagement of a user to the video distribution system 1 can be represented in points, for example. The points of the user may increase or decrease depending on how the user uses the video distribution system 1. The points of the user may increase if, for example, the user watches videos, distributes videos, posts comments on videos, gifts something to distributors distributing videos, purchases gifts (gift objects), logs in the video distribution system 1, starts the application software to watch videos, sends messages to other users via the social networking service provided by the video distribution system 1, receives positive evaluations from other users on the social networking service and uses the video distribution system 1 in any other ways. The points of the user may decrease if, for example, the user is prohibited by distributors of videos from watching the videos (blocked), his/her posted comments are deleted, the user receives negative evaluations from other users on the social networking service provided by the video distribution system 1, and the user uses the video distribution system 1 in any other manners. The user's behaviors related to the increase or decrease in points are not limited to these. While the points possessed by the user may increase when the user's behavior strengthens the connection between the user and the distributor user or other viewer users, the points possessed by the user may decrease when the user's behavior weakens the connection between the user and the distributor user or other viewer users.

In one embodiment, a smaller number of users belong to the first group than to the second group. When signing up for the video distribution system 1, a user is determined to belong to the second group. After starting to use the video distribution system 1, the user may leave the second group and belong to the first group once s/he satisfies the criteria of the first group. Alternatively, it is not determined which group a user belongs when the user signs up for the video distribution system 1. The user may be determined to belong to the first group only if the user satisfies certain conditions after starting to use the service. Whether or not a user belongs to the first group can be determined by, for example, referring to a flag that is set in the user data and identifies the user as belonging to the first group. If new users are determined to belong to the second group, the number of the users belonging to the first group can be set smaller than the number of the users belonging to the second group. The group to which a user belongs may depend on how the user uses the video distribution system 1. If a user no longer satisfies the criteria of the first group, the user may leave the first group and newly belong to the second group.

In one embodiment, the criteria of the first group may be adjusted such that the number of users belonging to the first group remains less than the number of users belonging to the second group. For example, the server device 20 monitors the number of users belonging to the first group and the number of users belonging to the second group. If the difference therebetween becomes smaller than a predetermined value, the server device 20 may apply stricter criteria to classify the users into the first group. An example case where a user who has 100 points or more is initially classified into the first group is assumed. If the difference between the number of users belonging to the first group and the number of users belonging to the second group becomes smaller than a predetermined value, the criteria may be changed to classify a user into the first group if the user has 200 points or more.

In one embodiment, there may be an upper limit on the number of the users belonging to the first group. If such is the case, the users of the video distribution system 1 may be ranked according to their points, and the same number of users as the upper limit may be selected starting from the top if the ranking and determined to belong to the first group. Since it is not ensured that all of the highly ranked users log in the video distribution system 1, the logged-in users of the video distribution system 1 may be ranked according to their points, and the same number of users as the upper limit may be selected starting from the top of the ranking and determined to belong to the first group.

The grouping may be performed by referring to global or local points of each user. The global points may be globally used in the entire video distribution system 1 and the local points may be locally administered by each distributor user. For example, a user may be given local points for a distributor user A and local points for a distributor user B that are be separately administered. As for the videos distributed by the distributor A (i.e., the videos including the character object of the distributor A), the users may be ranked according to their local points administered in relation to the distributor A, and the same number of users as the upper limit may be selected starting from the top of the ranking and determined to belong to the first group. In this way, a user may be determined to belong to the second group according to the ranking based on the global points of the video distribution system 1 but determined to belong to the first group in relation to a particular distributor user. If the local points are managed in this manner, the users can be grouped in relation to each distributor user according to their engagement in the distributor user.

As described above, when having points greater than a predetermined threshold value, a user is determined to belong to the first group. When having points less than the predetermined threshold value, on the other hand, the user is determined to belong to the second group. In this manner, users having points greater than the threshold value belong to the first group and users having points less than the threshold value belong to the second group. In a case where the points indicate the level of the engagement in the video distribution system 1, relatively highly engaged users in the video distribution system 1 can belong to the first group and less engaged users in the video distribution system 1 can belong to the second group.

The manner of grouping the users is not limited to the examples specifically described in the specification. Alternatively, the users may be classified into three or more groups. In addition, any classification criteria for determining which group each user belongs to may be modified as appropriate.

As shown in FIG. 4, the avatar data 23*d* can include avatar identification information of the avatar used by each user in the video distribution system 1 and avatar display information used to display the avatar in the video. In other words, the storage 23 can store therein, in association with the avatar identification information of the avatar, the avatar display information used to display the avatar. The avatar identification information is, for example, an avatar ID identifying the avatar. The avatar is displayed in the video in the form of, for example, an image resembling a human or animal. The avatar display information is used to display the avatar within the video. The avatar information includes part information indicating images of parts constituting the avatar, for example, the head, hair style, facial parts (eyes, nose, mouth and the like), torso, outfit, accessories, belongings and the like. The user can register his/her avatar by selecting favorite part images. The avatar display information may include 2D display information used to display the avatar two-dimensionally in the video and 3D display information used to display the avatar three-dimensionally in the video. The 3D display information includes part information indicating the images of the parts used to three-dimensionally display the avatar in the video, rig data used to represent the three-dimensional motion of the avatar, and any other known information used to display the avatar three-dimensionally.

The viewer user can allow his/her avatar to participate in the video being distributed from the video distribution system 1. The participation management data 23e stored in the storage 23 is used to manage the avatars participating in the video. As shown in FIG. 5, the participation management data 23e can include video identification information identifying the video being distributed in the video distribution system 1, participation limiting information designating the upper limit on the number of avatars that are allowed to participate in the video and participating avatar information indicating the avatars participating in the video. The video identification information is, for example, a video ID identifying the video. The participation limiting information for the video indicates, for example, an upper limit on the number of avatars that are allowed to participate in the video. The participation limiting information may include a second upper limit indicating the upper limit on the number of avatars that are allowed to be placed within a second region within the virtual space, which will be described below. The participation limiting information may include a first upper limit indicating the upper limit on the number of avatars that are allowed to be placed within a first region within the virtual space, which will be described below. The participating avatar information for the video may indicate an avatar ID identifying the avatar participating in the video. When a plurality of avatars participate in the video, the participating avatar information includes the avatar ID of each avatar.

Functions realized by the computer processor 21 will be now described more specifically. The computer processor 21 functions as a body motion data generation unit 21a, a face motion data generation unit 21b, an animation generation unit 21c, a video generation unit 21d, a video distribution unit 21e, a gift processing unit 21f, a participation request processing unit 21g, an avatar displaying unit 21h, an avatar control unit 21i and a display request processing unit 21j by executing computer-readable instructions included in a distribution program. At least some of the functions that can be realized by the computer processor 21 may be realized by a computer processor other than the computer processor 21 of the video distribution system 1. For example, at least some of the functions realized by the computer processor 21 may be realized by a computer processor mounted on the supporter computer 40 or any other not-shown computer processors. For example, when the client device 10 generates a video, the animation generation unit 21c, video generation unit 21d and any other functions necessary to generate a video by the client device 10 may be realized by the computer processor provided in the client device 10.

The body motion data generation unit 21a generates body motion data of each body part of the actor A1 based on detection result information provided by the corresponding one of the motion sensors 31a to 31f. The body motion data is serially generated with time as needed. For example, the body motion data may be generated at predetermined sampling time intervals. Thus, the body motion data can represent body motions of the actor A1 in time series as digital data. In the illustrated embodiment, the motion sensors 31a to 31f are attached to the left and right hands and feet, waist and head of the actor A1. Accordingly, based on the detection result information provided by the motion sensors 31a to 31f, it is possible to digitally represent the position and orientation of the substantially all body parts of the actor A1 in time series. The body motion data can define, for example, the position and rotation angle of bones corresponding to the rig data included in the model data 23a.

The face motion data generation unit 21b generates face motion data, which is a digital representation of the face motion of the actor A1, based on the captured image data provided by the camera 37a. The face motion data is serially generated with time as needed. For example, the face motion data may be generated at predetermined sampling time intervals. Thus, the face motion data can digitally represent facial motions (changes in facial expression) of the actor A1 in time series.

The animation generation unit 21c is configured to apply the body motion data generated by the body motion data generation unit 21a and the face motion data generated by the face motion data generation unit 21b to predetermined model data included in the model data 23a in order to generate an animation of a character object that moves in a virtual space and whose facial expression changes. More specifically, the animation generation unit 21c is capable of generating an animation of a character object whose body moves and whose facial expression changes in synchronization with the body motion and facial expression of the actor A1, based on the body motion data and face motion data of the actor A1.

The video generation unit 21d constructs a virtual space using the object data 23b, and generates a video that includes the virtual space and the animation of the character object corresponding to the actor A1. More specifically, the video generation unit 21d generates a sequence of video frames including the virtual space and the animation of the character object. The character object of the actor A1 may be positioned in the virtual space such that its position corresponds to the position of the actor A1 relative to the digital camera 36a.

In one embodiment, the video generation unit 21d determines configuration information of a virtual camera (its position in the virtual space, gaze position, gazing direction, and angle of view), determines a rendering area in the entire virtual space based on the configuration information of the virtual camera and generates video information used for displaying the rendering area of the virtual space.

The video generation unit 21d is able to include, with the generated video, voices of the actor A1 collected by the microphone in the studio unit 30. As described above, the video generation unit 21d can generate the animation of the character object moving in synchronization with the body and face motion of the actor A1 and add the voices of the actor A1 to the animation, thereby generating a video to be distributed.

The video generation unit 21d can, before the video is distributed, load avatar display information required to display avatars that are possibly to participate in the video. The video generation unit 21d can load, of the avatar display information, the 3D display information that requires a lengthy time and high processing load to be loaded. For example, the video generation unit 21d can read and load, from the storage 23, avatar display information required to display the avatars of the users belonging to the first group. In one embodiment, the video generation unit 21d can read and load, from the storage 23, 3D display information required to three-dimensionally display the avatars of the users belonging to the first group.

In one embodiment, the video generation unit 21d can load 3D display information for avatars the number of which is equal to or less than the first upper limit. In one embodiment, the video generation unit 21d can load 3D display information of avatars the number of which is equal to or less than the sum of the first and second upper limits.

The loaded avatar display information can be referred to when an avatar is displayed in the video in response to a participation request made by a user. How to use the loaded avatar display information in order to display the avatar in the video will be described below.

The video distribution unit 21e distributes the video generated by the video generation unit 21d. The video is distributed to the client devices 10a to 10c and other client devices over the network 15. The received video is reproduced on the client devices 10a to 10c. The video may be distributed to a client device (not shown) installed in the studio room R, and projected from the client device onto the screen S via a short focus projector. The video may also be distributed to the supporter computer 40. In this way, the supporters B1 and B2 can check how the distributed video appears on the screen.

A distributor user may refer to the user involved in the generation and/or distribution of the video distributed from the video distribution unit 21e. In the above example, the video distributed from the server device 20 includes the character object generated based on the body motion data and face motion data of the actor A1 and distributed with the help of the supporters B1 and B2 when necessary. In this case, the actor A1 and supporters B1 and B2 may be each referred to as "a distributer user," or the actor A1 and supporters B1 and B2 may be collectively referred to as "a distributer user."

FIG. 6 schematically shows an example of the virtual space constructed by the video generation unit 21d. The virtual space is defined as a space shaped like the entire celestial sphere covering the center thereof. A position in the virtual space is designated by coordinate values defined in a three-dimensional global coordinate system defined in the virtual space. For the sake of description, however, FIG. 6 only shows a part of the virtual space and does not show the coordinate system. FIG. 6 shows a hypothetical case where 10 users participate in a video using their avatars.

In a virtual space 50 shown in FIG. 6, a character object 51 of the actor A1, five virtual cameras 53a to 53e, a stage object 54 representing the stage on which the character object 51 is arranged and avatar objects 56a to 56c, and 57a to 57g showing avatars are arranged. The stage object 54 includes a floor object 54a corresponding to a floor of a studio on which the character object 51 stands and a screen object 54b extending perpendicularly from the floor object 54a at one of the edges of the floor object 54a that face each other in the horizontal direction. For example, the floor object 54a extends horizontally in the virtual space, and the screen object 54b extends vertically in the virtual space. In the virtual space 50, a first region 52a and a second region 52b are defined. In the illustrated embodiment, the avatar objects 56a to 56c are arranged in the first region 52a, and the avatar objects 57a to 57g are arranged in the second region 52b. In the virtual space 50, the first region 52a is arranged closer to the character object 51 than is the second region 52b. In one embodiment, the character object 51 is arranged within the floor object 54a. Accordingly, the first region 52a is closer to the floor object 54a than is the second region 52b. The first and second regions 52a and 52b may be positioned in the virtual space 50 differently than in FIG. 6. The first and second regions 52a and 52b may be arranged at any position within the virtual space 50. For example, the first and second regions 52a and 52b may be arranged within the floor object 54a. For example, the first and second regions 52a and 52b may be arranged, in the floor object 54a, behind the character object 51 from the perspective of the virtual camera 53a. In one embodiment, the first region 52a is a region where the avatars of the users belonging to the first group are displayed, and the second region 52b is a region where the avatars of the users belonging to the second group (or not belonging to the first group) are displayed. As used herein, a third region may refer to the region where the character object 51 is arranged. In the illustrated example, the floor object 54a corresponds to the third region. The virtual space 50 includes comment display regions 55a to 55c where comments posted by users watching the video are displayed. The comment display regions 55a to 55c may be objects in the virtual space 50. The virtual space 50 is not limited to the embodiment explicitly described herein. The virtual space 50 can include various objects other than those explicitly described herein.

The virtual cameras 53a to 53e are positioned differently from each other in the virtual space 50. The virtual cameras 53a to 53e are all oriented to face the character object 51. The images constituting the video generated by the video generation unit 21d show a rendering region that is part of the virtual space 50 and viewed from the perspective of a selected one of the virtual cameras 53a to 53e. The configuration information of the virtual cameras 53a to 53e (its position in the virtual space, gazing position, gazing direction and viewing angle) may be changed by the actor A1, supporter B1, supporter B2 or any other operators manipulating the configuration information while the video is being distributed.

As described above, three avatar objects 56a to 56c are arranged in the first region 52a, and seven avatar objects 57a to 57g are arranged in the second region 52b. In one embodiment, the first and second upper limits are defined. The first upper limit denotes the upper limit on the number of avatars that are allowed to be arranged in the first region 52a, and the second upper limit denotes the upper limit on the number of avatars that are allowed to be arranged in the second region 52b. The first and second upper limits may be stored in the storage 23 as part of the participation management data 23e.

Figure 7A:
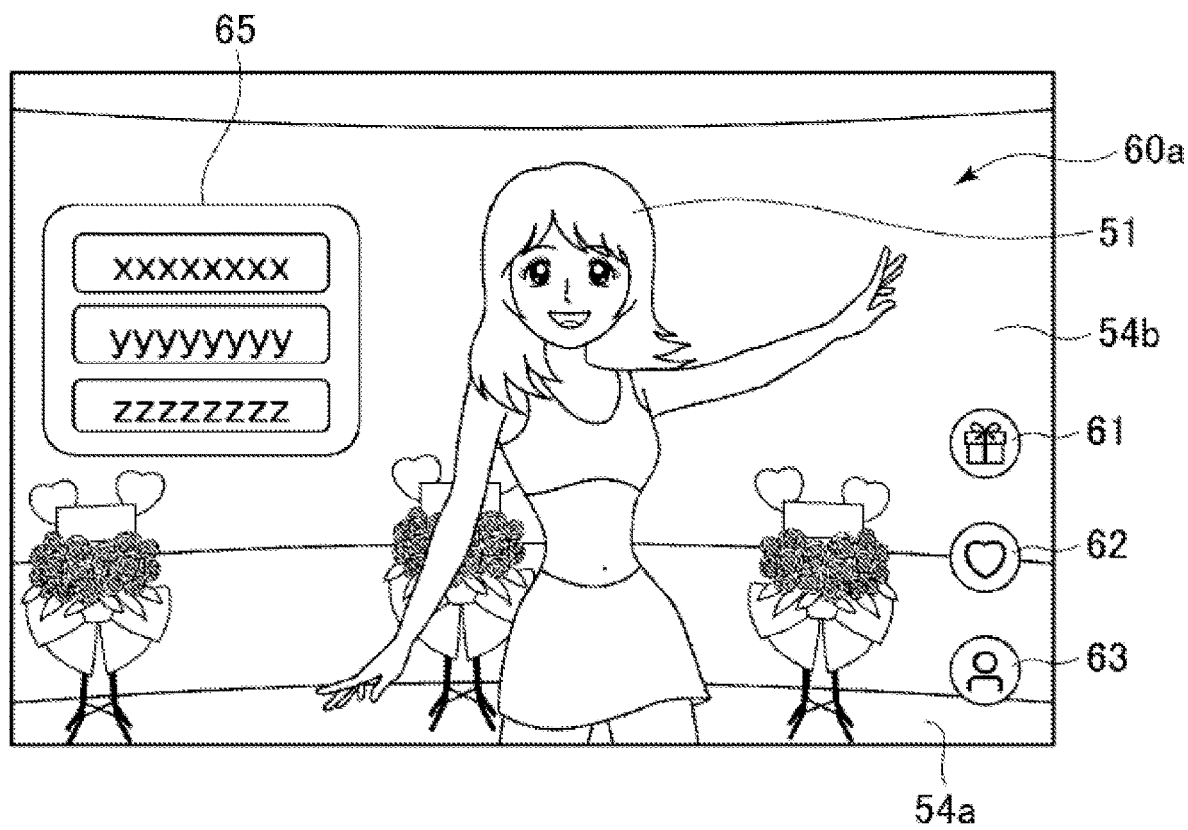
FIG. 7A illustrates an example view displayed on a client device 10a in one embodiment. In the view shown in FIG. 7A, a participation request button for enabling an avatar to participate in a video is displayed.

FIGS. 7A to 7F show, as an example, how the video generated by the video generation unit 21d and distributed by the video distribution unit 21e appears on the screen. FIGS. 7A to 7F show frame images (frames) constituting the video distributed by the video distribution unit 21e and played back by the client devices 10a to 10c. The following description is made assuming that the images shown in FIGS. 7A to 7F are displayed on the client device 10a used by the first viewer user. The view shown in FIG. 7A is displayed on the display of the client device 10a when the client device 10a executes the watching app and plays back the video distributed from the server device 20. FIG. 7A shows, as an example, how an image 60a appears. The image 60a shows a rendering region viewed from the perspective of the virtual camera 53a. It is, however, assumed that the avatar 56a of the first viewer user is not yet arranged within the virtual space 50 at the time of rendering the image 60a. In other words, the avatar 56a is not arranged in a part of the virtual space 50 corresponding to the image 60a.

As illustrated, the image 60a includes the character object 51, the floor object 54a on which the character object 51 stands, and the screen object 54b defining the back edge of the stage. The image 60a also includes a display section 65 for displaying therein comments from viewer users and notifications from the system.

The character object 51 is generated by applying the body motion data and face motion data of the actor A1 to the model data for the actor A1 included in the model data 23a. The character object 51 is motion-controlled based on the body motion data and face motion data. Thus, the character object 51 is controlled to move in the screen in synchronization with the body and face motions of the actor A1.

In the image 60a, the objects arranged in the virtual space 50 appear, and manipulation buttons for receiving the user's manipulation may also appear. According to the example shown in FIG. 6, the image 60a includes a gift button 61 for gifting, an evaluation button 62 for making evaluation and an avatar participation button 63 for allowing an avatar to participate. Other manipulation buttons may appear in the image 60a.

The gift button 61 appears in the image 60a such that it is selectable by an operation made on the client device 10a displaying the image 60a. The gift button 61 may be selected, for example, by tapping a region of a touch-screen panel of the client device 10a where the gift button 61 is displayed. In one embodiment, when the gift button 61 is selected, the view 60a displays a window for selecting a gift to be gifted to the distributor distributing the video being watched. The user of the client device 10a is able to select and purchase a gift to be gifted from among the gifts displayed in the window. In another embodiment, in response to the gift button 61 being selected, a window appears in the image 60a and presents a list of purchased gifts and/or a list of selectable gifts. In this case, the user watching the video is able to select a gift to be gifted from among the listed gifts appearing in the window. In one embodiment, when the gift button 61 is selected on the client device 10, a gifting request may be transmitted to the server device 60. The gifting request may include gift identification information (a gift ID) that identifies a gift object corresponding to a gift to be gifted. As described above, the viewer user watching the video can present a desired gift to the distributer user distributing the video by selecting the gift button 61.

The gift processing unit 21f receives the gifting request from the client device 10a of the user and processes the gifting request. As described above, the user watching the video is able to transmit a gifting request to the server device 20 by operating his/her client device.

In one embodiment, on reception of the gifting request, the gift processing unit 21f refers to the gifting request to identify a gift object to be gifted and performs display processing corresponding to the identified gift object. As mentioned above, the gift object may include the effect object, normal object, and decorative object. When the gift object identified by the gifting request is an effect object, the gift processing unit 21f performs processing to display the effect object in the image 60a of the video. For example, when a gifting request is made to request an effect object corresponding to confetti, the gift processing unit 21f displays in the image 60a the effect object resembling confetti based on the gifting request. In one embodiment, when receiving a gifting request to request a specific normal object, the gift processing unit 21f performs processing to display in the video the normal object identified by the gifting request. For example, when a gifting request is made to request a normal object resembling a stuffed bear, the gift processing unit 21f displays in the image 60a the normal object resembling a stuffed bear.

In one embodiment, when receiving a gifting request to request a specific decorative object from the viewer user, the gift processing unit 21f adds to a list of candidates the decorative object identified by the gifting request. The list of candidates is displayed, for example, on the display of the supporter computer 40. The supporters B1 and B2 can select a decorative object to be displayed in the video, from the list of candidates displayed on the display of the supporter computer 40. The gift processing unit 21f displays the selected decorative object in the view 60a of the video. The selected decorative object is displayed in the image 60a in association with a specific body part of the character object 51. For example, when the decorative object is an object resembling a headband, the decorative object may be attached to the head of the character object 51. The decorative object may be displayed in the view 60a such that it follows the movement of the specific body part of the character object. For example, when the head of the character object 51 wearing the headband moves, the selected decorative object resembling the headband follows the motion of the head of the character object 51 as if the headband is worn on the head of the character object 51.

The evaluation button 62 is displayed on the view 60a such that it is selectable by the user using the client device 10a. The evaluation button 62 may be selected, for example, by tapping a region of the touch-screen panel of the client device 10a where the evaluation button 62 is displayed. When the evaluation button 62 is selected by the user watching the video, evaluation updating information may be transmitted to the server device 20. The evaluation updating information may indicate that positive evaluation has been made on the distributer user distributing the video (for example, the actor A1) or on the video being distributed. Once the evaluation button 62 is selected, evaluation information indicating that negative evaluation has been made on the video may be transmitted to the server device 20.

The avatar participation button 63 is displayed in the view 60a such that it is selectable by the first viewer user using the client device 10a. The avatar participation button 63 may be selected, for example, by tapping a region of the touch-screen panel of the client device 10a where the avatar participation button 63 is displayed. When the avatar participation button 63 is selected by the first viewer user watching the video, participation request to request participation of the avatar of the first viewer user in the video is transmitted to the server device 20. The user who has transmitted the participation request by selecting the avatar participation button 63 may be referred to as "a participation applying user." The participation request from the participation applying user may include a user ID identifying the participation applying user and an avatar ID identifying the avatar of the participation applying user. When the first viewer user selects the avatar participation button 63 but has not registered his/her avatar, the client device 10a may display a view prompting the first viewer user to register his/her avatar. In this case, the first viewer user can register his/her avatar by following the guidance in the view.

The participation request processing unit 21g receives the participation request made by the participation applying user and determines based on the participation request whether the avatar of the participation applying user can be displayed. In one embodiment, the participation request processing unit 21g can determine which one of the first and second groups the participation applying user belongs. For example, the participation request processing unit 21g refers to the group information of the user data 23c to determine which one of the first and second groups the participation applying user belongs. An example case is assumed where the user information specifies that the user belongs to the first group by setting a flag in the user ID, not in the group ID. In this case, if such a flag is set for the participation applying user, the participation applying user can be determined to belong to the first group. If the flag is not set, on the other hand, the participation applying user can be determined to belong to the second group (or determined not to belong to the first group).

When the participation applying user is determined to belong to the first group, the participation request processing unit 21g places the avatar of the participation applying user in the first region 52a of the virtual space 50. For example, when the first viewer user transmits a participation request through the client device 10a and the first viewer user is determined to belong to the first group, the avatar 56a corresponding to the first viewer user is placed in the first region 52a as shown in FIG. 6. When the first viewer user is determined to belong to the first group, no additional conditions may be required and the avatar 56a of the first viewer user may be displayed in the first region 52a. After approval is given to the participation of the avatar 56a of the first viewer user, some presentation effects may be displayed in relation to the participation of the avatar 56a, before the avatar 56a is arranged in the first region 52a, or after the avatar 56a is arranged in the first region 52a. For example, in order to allow the avatar 56a to attract attention, presentation can be made such that spotlight is shed on the avatar 56a. The presentation relating to the participation of the avatar is not limited to the embodiment explicitly described herein.

When the participation applying user is determined to belong to the second group, the participation request processing unit 21g determines whether the participation applying user satisfies a condition for participation, and arranges the avatar of the participation applying user in the second region 52b if it determines the participation applying user satisfies the condition for participation. For example, when the first viewer user transmits a participation request through the client device 10a and the first viewer user is determined to belong to the second group, the avatar 56a is arranged in the second region 52b, unlike the manner shown in FIG. 6. When the avatar 56a is arranged in the second region 52b, the above-described presentation effects can be also displayed in the video.

When approval is given to the participation of the avatar in the video in response to the participation request, the avatar may be prohibited from participating in other videos. For example, when approval is given to the participation of the avatar in the video in response to the participation request, a flag is set as part of the avatar data 23d in order to indicate that the avatar is participating in the video and the flag may be referred to in order to determine whether approval should be given to a participation request made by the user using the avatar to request participation in other videos. Specifically, a case is assumed where an avatar participates in a video and the user of this avatar makes a participation request to request participation in another video. If such is the case, the avatar data 23d is referred to. If a flag indicating that the avatar is participating in the video is set, the participation request may be rejected. The procedure of prohibiting the single avatar from participating in two or more videos may be performed by the participation request processing unit 21g.

As described above, when the participation applying user belongs to the second group, it is determined whether the participation applying user satisfies a condition for participation. Next, a description is given of the condition for participation. In one embodiment, the condition for participation is defined such that the number of avatars arranged in the second region 52b is less than the second upper limit defined for the second region 52b. As an example, it is assumed that the second upper limit on the number of the allowable avatars in the second region 52b shown in FIG. 6 is seven. In this example, when a participation request is received from a participation applying user belonging to the second group, it is determined that the condition for participation is not satisfied since the number of avatars (57a to 57g) arranged in the second region 52b already reaches seven or the upper limit. In this case, no approval is given to the participation request made by the participation applying user and the avatar of the participation applying user is not placed in the virtual space 50. As another example, it is assumed that the second upper limit on the number of allowable avatars in the second region 52b shown in FIG. 6 is twelve. In this example, when a participation request is received from a participation applying user belonging to the second group, it is determined that the condition for participation is satisfied since the number of avatars (57a to 57g) arranged in the second region 52b is seven and less than the upper limit. In this case, the avatar of the participation applying user is arranged in the second display region 52b.

The avatars arranged in the first or second region 52a or 52b can stop participating in and leave the video in response to manipulation made by the user using the avatar. For example, when the avatar 56a of the first viewer user is arranged in the first or second region 52a or 52b of the video, the first viewer user can transmit to the server device 20 an exit request to request exit of the avatar 56a, by manipulating the client device 10a. When receiving the exit request, the server device 20 (for example, the participation request processing unit 21g) can perform a procedure of allowing the avatar 56a of the first viewer user to exit the video, in response to the exit request. When an upper limit is defined for the number of avatars that are allowed to participate in the first or second region 52a or 52b, other users' avatars are allowed to participate in the first or second region 52a or 52b once the avatar of the user who has made the exit request exits following the exit request. When the avatar exits the video, presentation effects relating to the exit of the avatar may be displayed in the video. For example, presentation can be made such that spotlight is shed on the exiting avatar. The presentation relating to the exit of the avatar is not limited to the embodiment explicitly described herein.

In one embodiment, the procedure of allowing the avatar to exit the video may be performed when the user using the avatar ends the watching app being used to watch the video.

In another embodiment, even if the user whose avatar is participating in the video terminates the use of the watching app to watch the video, the avatar may remain appearing in the video.

In another embodiment, the condition for participation is defined such that the participation applying user is selected by the distributor user. The distributor user includes, for example, the actor A1 and supporters B1 and B2. When receiving a participation request from a given participation applying user, the participation request processing unit 21g may generate a list of participation request users including an indicator identifying the given participation applying user and present the list of participation request users to the distributor user. The list of participation request users for a video lists participation applying users who have made a participation request for the video. The participation request processing unit 21*g* can transmit the list of participation request user to the supporter computer 40. The supporters B1 and B2 can select a user who is approved of participation from the list of participation request users displayed on the display of the supporter computer 40. The list of participation request users may be displayed on the display 39 of the studio room R. The actor A1 may select a user who is approved of participating in the video, from the list of participation request users, by manipulating the controller 33*a* or 33*b*. The participation request processing unit 21*g* can place the avatar of the participation applying user selected by the distributor user of the video (i.e., the participation applying user approved of participating in the video) in the second display region 52*b*.

The avatar displaying unit 21*h* performs a procedure of displaying in the image the avatar determined by the participation request processing unit 21*g* to be arranged in the first and second regions 52*a* and 52*b*. For example, when displaying the avatar of the first viewer user in the first region 52*a*, the avatar displaying unit 21*h* consults the user data 23*c* to identify the avatar ID associated with the user ID of the first viewer user and then consults the avatar data 23*d* to identify the part information associated with the avatar ID. The avatar displaying unit 21*h* constructs an avatar object representing the avatar of the first viewer user based on the identified part information and arranges the avatar object in the first region 52*a*. In this way, when the first region 52*a* is included within the rendering regions of the virtual cameras, the avatar object representing the avatar of the first viewer user appears in the video. When the avatar is three-dimensionally displayed, the avatar object is constructed based on part information for 3D display. When the avatar is two-dimensionally displayed, the avatar object is constructed based on part information for 2D display.

Figure 7B:
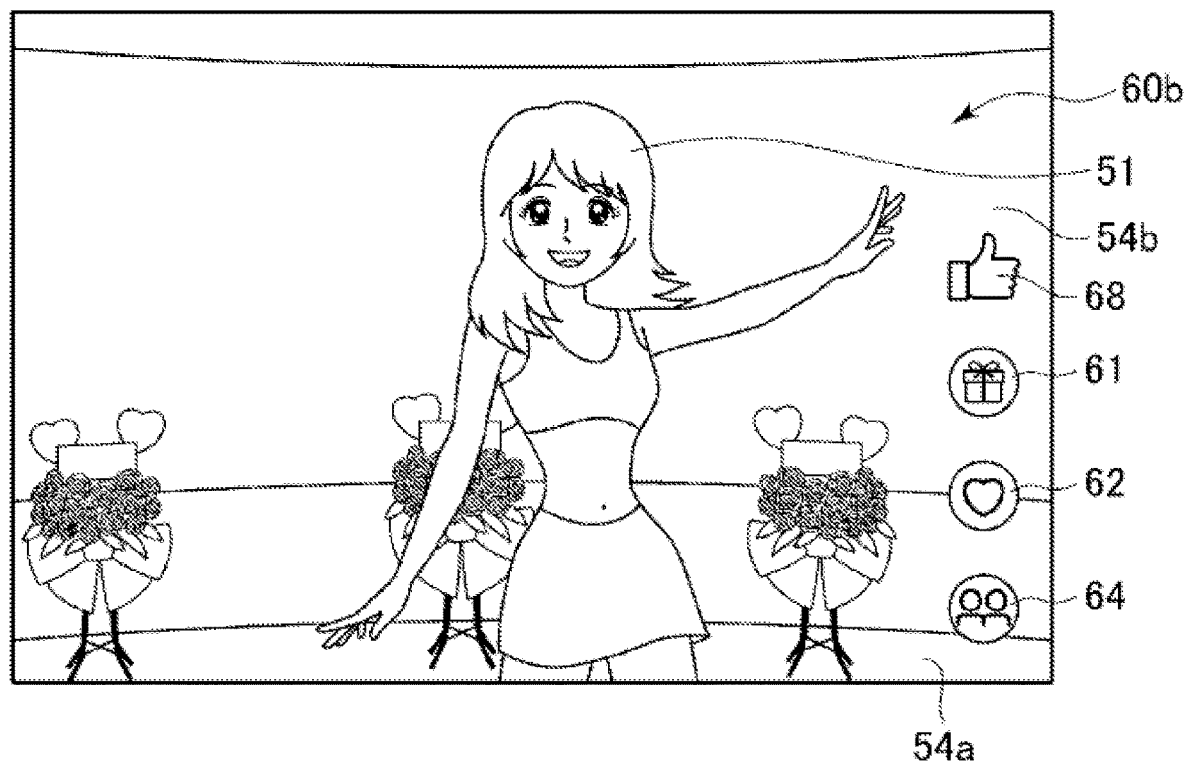
FIG. 7B illustrates an example view displayed on the client device 10a in one embodiment. In the view shown in FIG. 7B, a display request button for requesting that an avatar be displayed together with a character of a distributer user is displayed.
Figure 7C:
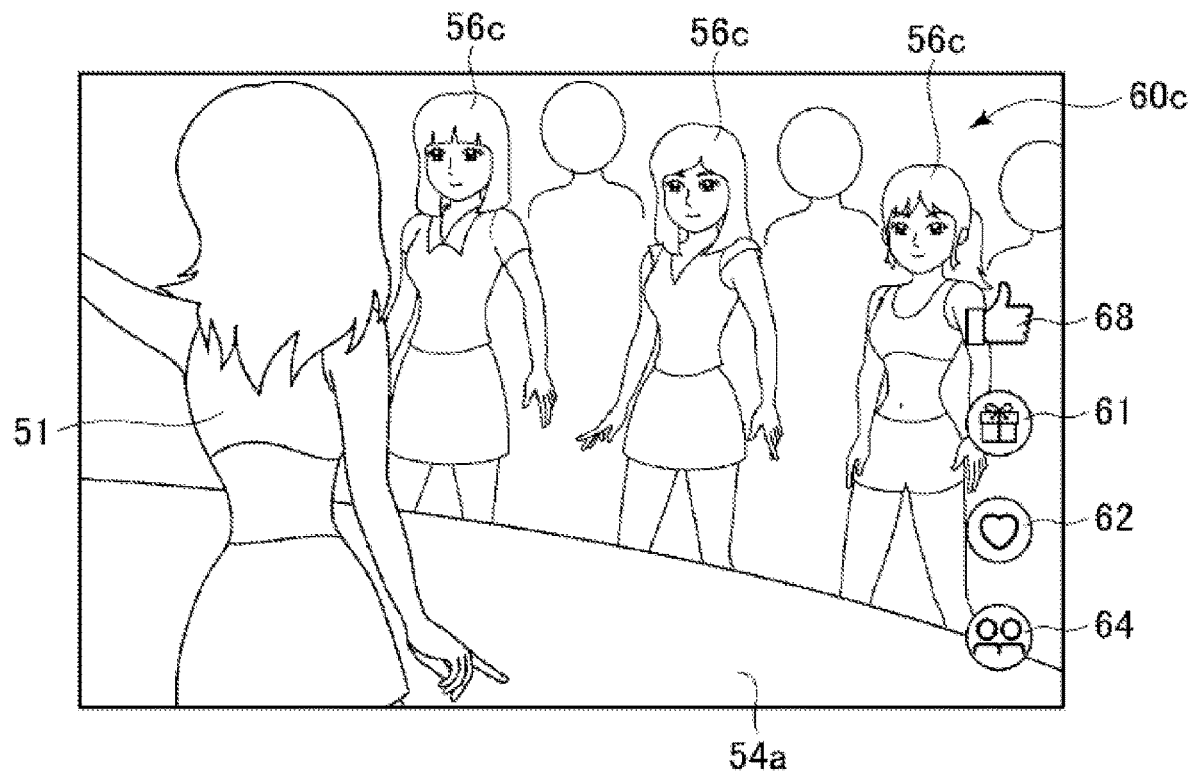
FIG. 7C shows an example view containing an image of a virtual space captured by a different virtual camera.
Figure 7D:
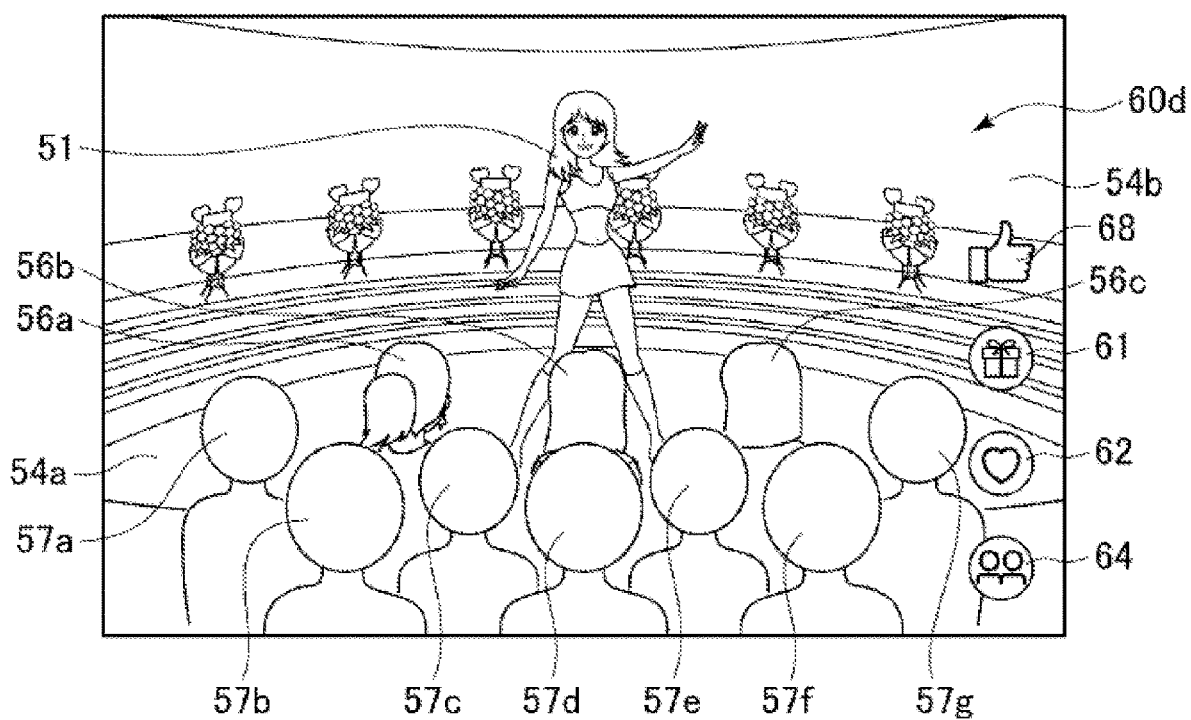
FIG. 7D shows an example view containing an image of the virtual space captured by a further different virtual camera.

The following describes, with reference to FIGS. 7B to 7D, an image where the avatar 56*a* of the first viewer user is arranged in the first region 52*a* within the virtual space 50 since the first viewer user selects the avatar participation button 63. FIG. 7B shows an example image 60*b* rendered from the perspective of the virtual camera 53*a*, similarly to the image 60*a* shown in FIG. 7A. Accordingly, the positions of the character object 51 and other objects in the image 60*b* are substantially the same as the positions of the corresponding objects in the image 60*a*. Since the virtual camera 53*a* is positioned between the first region 52*a* and the character object 51, the avatar of the first viewer user positioned in the first or second region 52*a* or 52*b* does not appear in the image 60*b* showing the rendering region from the perspective of the virtual camera 53*a*.

Another example view of the video in which the avatar 56*a* of the first viewer user is arranged in the first region 52*a* within the virtual space 50 is shown in FIG. 7C. Unlike the image shown in FIG. 7B, an image 60*c* shown in FIG. 7C is rendered from the perspective of the virtual camera 53*c*. The virtual camera 53*c* is arranged behind the character object 51 on the right side to face the character object 51. Accordingly, the image 60*c* rendered from the perspective of the virtual camera 53*c* includes the character object 51 seen from the right rear and the avatars 56*a* to 56*c* arranged in the first region 52*a*. Considering the relative positions of the virtual camera 53*c*, first region 52*a* and second region 52*b*, the image 60*c* also shows some of the avatars arranged in the second region 52*b* while being hidden behind the avatars 56*a* to 56*c*. The avatars 56*a* to 56*c* and avatars 57*a* to 57*g* may be two-dimensionally displayed. In this case, the two-dimensionally displayed avatars 56*a* to 56*c* and avatars 57*a* to 57*g* appear in the virtual space 50 together with the other three-dimensionally displayed objects. If the avatars 56*a* to 56*c* and avatars 57*a* to 57*g* are two-dimensionally displayed, the rendering load can be reduced. It may be only the avatars 57*a* to 57*g* arranged in the back that are two-dimensionally displayed. Since the rendering load is reduced, this enables more avatars to be displayed on the screen. In one embodiment, when the 3D display information of the avatars arranged in the virtual space 50 is loaded onto the video generation unit 21*d* before the start of the distribution of the video, the avatars can be three-dimensionally displayed in the video. The avatar displaying unit 21*h* can see whether the 3D display information have been loaded for the avatars to be placed in the virtual space 50 in response to their participation requests. If the 3D display information has been loaded for the avatars to be placed in the virtual space 50 in response to their participation requests, the avatar displaying unit 21*h* may three-dimensionally display the avatars in the video. If the 3D display information has not been loaded for the avatars, the avatar displaying unit 21*h* may two-dimensionally display the avatars in the video. In one embodiment, the avatar displaying unit 21*h* may runtime-load the 3D display information for the avatars to be placed in the virtual space 50 in response to their participation requests and three-dimensionally display the avatars in the video using the runtime-loaded 3D display information. In other words, while the video is being distributed (in parallel with the distribution of the video), the server device 20 may load the 3D display information of the avatars to be displayed in the video.

While an avatar is appearing in a video, the user of the avatar may replace the parts constructing the avatar with different options. When the parts of the avatar appearing in the video are changed, the avatar displaying unit 21*h* can reflect the change, thereby changing the appearance of the avatar in the video. For example, the user may change the hair style of his/her avatar from black hair to blond hair. In this case, the avatar displaying unit 21*h* can reflect the change in the image of the avatar appearing in the video, thereby changing the appearance of the avatar. The avatar displaying unit 21*h* can reflect, real-time or quasi-real-time, other types of changes made in the avatar during the distribution of the video than the change of parts in the avatar appearing in the video.

Still another example view of the video in which the avatar 56*a* of the first viewer user is arranged in the first region 52*a* within the virtual space 50 is shown in FIG. 7D. An image 60*d* shown in FIG. 7D is rendered from the perspective of the virtual camera 53*b*. The virtual camera 53*b* is arranged in front of the character object 51, further away from the character object 51 than is the virtual camera 53*a* to face the character object 51. For this reason, the image 60*d* rendered from the perspective of the virtual camera 53*b* includes a larger part of the virtual space 50 than the images 60*a* and 60*b*. Specifically, the image 60*d* includes the first and second regions 52*a* and 52*b*. Accordingly, the image 60*d* displays both the avatars 56*a* to 56*c* arranged in the first region 52*a* and the avatars 57*a* to 57*g* arranged in the second region 52*b*.

The image displayed on the client device 10 may show an emotion button 68. The emotion button 68 enables the viewer user to express his/her emotion while watching the video. By selecting the emotion button 68, the viewer user is able to select his/her emotion such that he/she was impressed with the video, that he/she was not able to sympathize with the video, or any other emotions of the viewer user. The emotion button 68 can include an applause button for showing that the viewer user is impressed by the video, a question mark button for showing that the viewer user does not sympathize with the video, a surprise button for showing that the viewer user is surprised at the video, and any other buttons. Each emotion button 68 may include a representation of a symbol or graphics indicating an emotion to be selected by selecting the emotion button 68. For example, the applause button may include a graphic representation of hands clapping, the question mark button may include a representation of a question mark, and the surprise button may include a representation of an exclamation mark. The emotion button 68 may be selected, for example, by tapping a region of the touch-screen panel of the client device 10a where the emotion button 68 is displayed. If the first viewer user watching the video selects the emotion button 68, an emotion display request is transmitted to the server device 20. The emotion display request may include emotion identification information indicating the type of the button selected by the first viewer user via the emotion button 68 (the applause button, question mark button, surprise button or the like) selected by the first viewer user. When the emotion button 68 is selected, a plurality of buttons (the applause button, surprise button and the like) associated with the emotion button 68 may pop up. When such a plurality of buttons associated with the emotion button 68 are displayed in pop-ups, the user can select one of the buttons displayed in the pop-ups that correctly describes his/her emotion. The emotion button 68 may be displayed when the avatar of the user is participating in the video and may not be displayed when the avatar of the user is not participating in the video. For example, in the illustrated embodiment, the emotion button 68 is not displayed in the image 60a since the avatar of the first viewer user is not participating in the video when the image 60a is displayed. Since the image 60b and the other images are obtained while the avatar of the first viewer user is participating in the video, the emotion button 68 appears in these images.

The avatar control unit 21i may receive the emotion display request from the first viewer user and control the behavior of the avatar of the first viewer user based on the received emotion display request. For example, when the emotion display request is transmitted in response to the first viewer user selecting one of the emotion buttons or an applause button, the avatar control unit 21i can control the avatar 56a of the first viewer user to applaud based on the emotion display request. When the avatar 56 is controlled to applaud based on the emotion display request, an animation showing the avatar 56a applauding may appear in the video as long as the avatar 56a is included in the rendering region as is the case of FIG. 7C or 7D. If the avatar 56a is not included in the rendering region as is the case of FIG. 7B, on the other hand, an animation showing the avatar 56a applauding may not appear while the sound of the applause of the avatar 56a appears in the video. In one embodiment, the emotion button may be displayed in the view of the video being watched by the user only when the avatar of the user appears in the video. For example, when the image 60b shown in FIG. 7B is displayed on the client device 10a of the first viewer user, the emotion button 68 may not appear in the image 60b since the avatar 56a of the first viewer user is not displayed in the image 60b. On the other hand, when the image 60c shown in FIG. 7C is displayed on the client device 10a of the first viewer user, the emotion button 68 may appear in the image 60c since the avatar 56a of the first viewer user is displayed in the image 60c.

As described above, based on the emotion display request made by the user, the avatar of the user claps hands or behaves in any other manner in the video. The emotion display request is one type of motion instructions to instruct the avatar to move. In other embodiments, the image may include a motion instruction button to instruct the avatar to move, in addition to the emotion button. The motion instruction button is designed to instruct the avatar to move. The motion instruction button may be used to instruct the avatar to move, for example, to jump, to wave his/her hands, to shake a cyalume and the like. If the motion instruction button is selected, a motion instruction request is transmitted to the server device 20. The server device 20 can control the avatar to move in the manner requested by the motion instruction request.

As shown in FIGS. 7B to 7D, when the images 60b to 60d are displayed, the avatar participation button 63 does not appear in the image 60b but instead a display request button 64 appears since the avatar 56a of the first viewer user is already in the virtual space 50. The display request button 64 is designed to request that the avatar of a viewer user be displayed along with the character object 51. The display request button 64 is displayed in the view 60b such that it is selectable by the first viewer user using the client device 10a. The display request button 64 may be selected, for example, by tapping a region of the touch-screen panel of the client device 10a where the display request button 64 is displayed. When the display request button 64 is selected by the first viewer user watching the video, a display request to request that the avatar 56a of the first viewer user be displayed together with the character object 51 is transmitted to the server device 20.

Figure 7E:
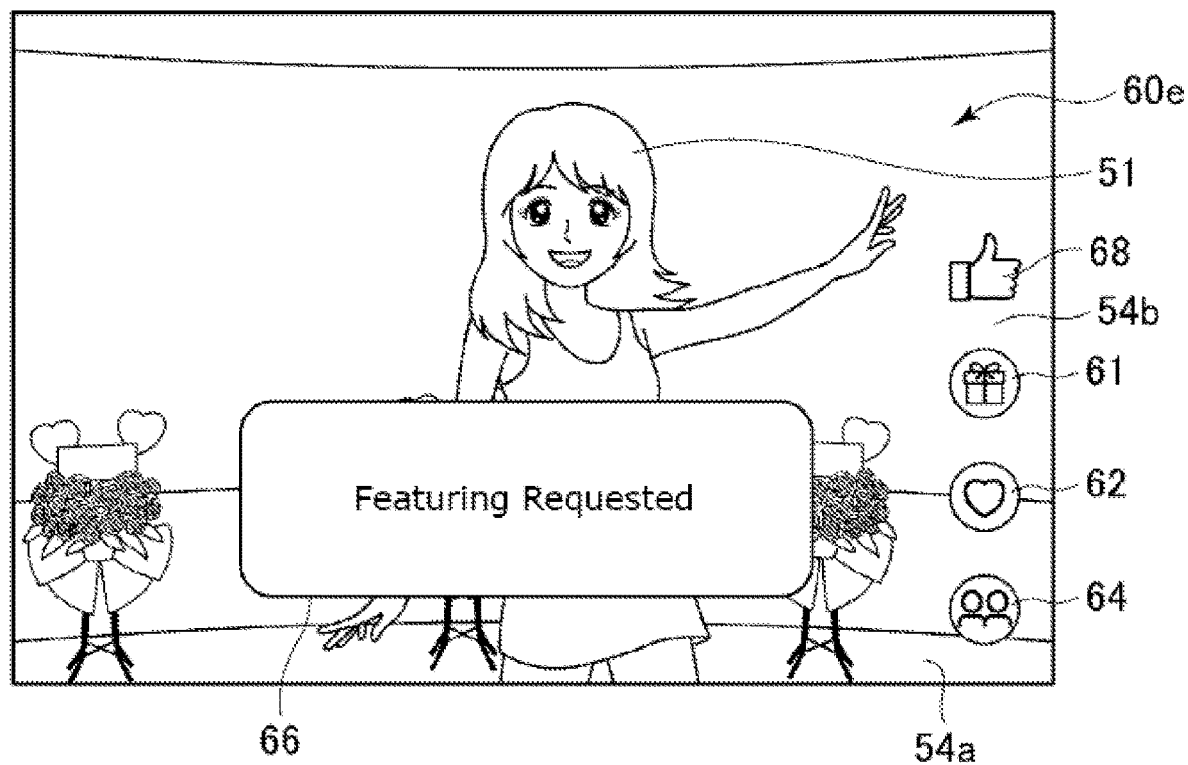
FIG. 7E shows an example view showing that a feature request has been made.
Figure 7F:
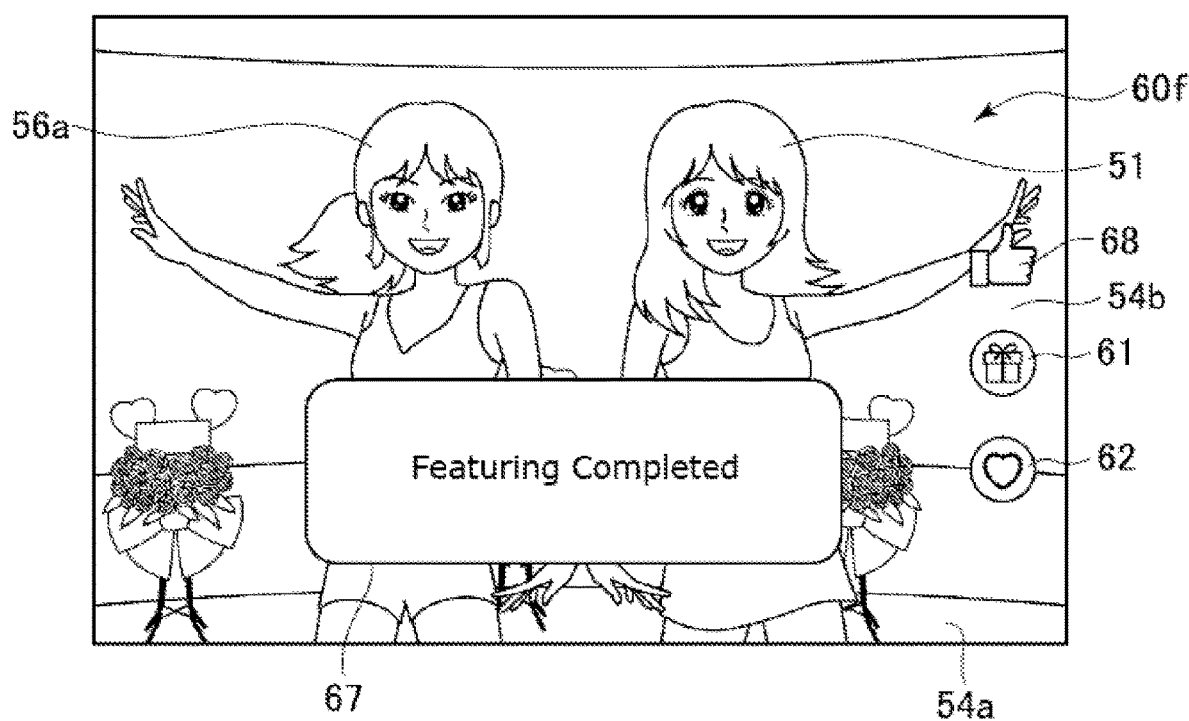
FIG. 7F illustrates an example view where an avatar and a character of a distributer user are displayed together.

The display request processing unit 21j receives the display request from the first viewer user and, based on the display request, displays the avatar 56a of the first viewer user in the video, together with the character object 51. The request to request that an avatar be displayed together with a character object (for example, the character object 51) included in a video being distributed may be referred to as "a feature request," and displaying the avatar together with the character object 51 in response to the feature request may be referred to as "featuring" the avatar. During the featuring, only the avatar of the user who has made the feature request is displayed along with the character object 51 and no other avatars may be displayed, as shown in FIG. 7F. As shown in FIG. 7E, when the user makes the feature request, a notification 66 may be displayed in the image 60e indicating that the feature request has been made. The notification 66 may be displayed only in the image displayed on the client device of the user who has made the feature request, or may be displayed not only in the image displayed on the client device of the user but also in the image displayed on the client device of another user. FIG. 7F shows an example image where the avatar 56a of the first viewer user and the character object 51 are both displayed. In an image 60f shown in FIG. 7F, the avatar 56a of the first viewer user is displayed next to the character object 51. The display request processing unit 21j may, based on the display request from the first viewer user, display the avatar 56a on the floor object 54a. Since the character object 51 is on the floor object 54a, the avatar 56a can be displayed together with the character object 51 if the avatar 56a is arranged on the floor object 54a. In the image 60f, a notification 67 to notify that the featuring has been completed may be displayed.

When the avatar 56a is displayed together with the character object 51 based on the feature request, the avatar 56a may be three-dimensionally displayed. As has been described, the avatar 56a may be two-dimensionally displayed in the image (for example, the image 60c or 60d) observed before the feature request is made. Before the feature request is made, the avatar 56a may be two-dimensionally displayed but may be alternatively three-dimensionally displayed once the featuring is completed. Since the avatar 56a is three-dimensionally displayed during the featuring, the image 60b, which is displayed on the client device 10a of the first viewer user, may show the display request button 64 only if the 3D display information for the avatar 56a is loaded before the reception of the feature request.

In one embodiment, the display request button 64 appears in the image intended for a user using an avatar for which the 3D display information has been loaded, and the display request button 64 does not appear in the image intended for a user using an avatar for which no 3D display information has been loaded. With such a design, the 3D display information does not need to be runtime-loaded. This can reduce the processing load of the server device 20. In one embodiment, the runtime-loading may be avoided in the following manner since it requires processing load. When a feature request is received for an avatar from the user, it is determined whether the 3D display information of the avatar has been loaded, and the avatar may be three-dimensionally displayed only when the 3D display information has been loaded. In this case, while the display request button 64 appears in the image intended for a user using an avatar for which the 3D display information has been loaded, the display request button 64 does not appear in the image intended for a user using an avatar for which no 3D display information has been loaded. Such a design can avoid fruitless transmission of a feature request and processing load resulting from such a feature request.

When the avatar is featured in the video, presentation effects relating to the featuring of the avatar may be displayed in the video. For example, in order to allow the featured avatar to attract attention, presentation can be made such that spotlight is shed on the avatar. When the featuring of the avatar is terminated, the same or different presentation effects can be displayed.

The display request processing unit 21j may measure a time that has elapsed after the avatar 56a of the first viewer user starts appearing in the video together with the character object 51. The display request processing unit 21j may display the elapsed time in the image 60f. In one embodiment, an upper limit may be set on the time during which the character object 51 and the user's avatar are displayed together based on the feature request (the duration of the featuring of the avatar). The display request processing unit 21j may display the upper limit in the image 60f. The display request processing unit 21j may calculate a remaining time during which the avatar 56a is allowed to remain displayed based on the upper limit and the time that has elapsed after the avatar 56a of the first viewer user starts appearing in the video together with the character object 51, and display the remaining time in the image 60f. The time that has elapsed since the avatar 56a of the first viewer user starts appearing in the video together with the character object 51, the upper limit imposed on the display time set for the avatar 56a and the remaining time during which the avatar 56a is allowed to be displayed may be included only in the image 60f displayed on the client device 10a of the first viewer user, or may be included in the image 60f displayed on the client devices of the first viewer user and other users. Since the upper limit is set on the duration of the featuring, more viewer users can be given opportunities to request featuring in order to cause their avatars to appear together with the character object 51. Since the remaining time is displayed for the ongoing featuring, the viewer user can be notified of the time left before featuring of the next avatar starts.

The display request processing unit 21j can eliminate the participating avatar from the video, based on an instruction from the distributor user of the video or other operators. The eliminated avatar is no longer displayed in the view of the video. Likewise, the display request processing unit 21j can eliminate the featured avatar from the featuring, based on an instruction from the distributor user of the video or other operators. The eliminated avatar is no longer displayed in the view of the featuring. The distributer user can eliminate, from the video and/or from the view of the featuring, an avatar who makes an undesirable comment in the video, an avatar who behaves unsuitably in the video and other undesirable avatars in the video, for example.

In one embodiment, when a user's avatar is featured, the avatar control unit 21i can control the motion of the avatar based on an instruction from the user. For example, the avatar control unit 21i can receive an emotion display request from the user of the featured avatar and control the behavior of the avatar based on the received emotion display request. The avatar control unit 21i may control the behavior of the avatar using the face or body motion transmitted from a terminal of the user.

In one embodiment, when the feature request from the first viewer user is approved by the distributer user, the display request processing unit 21j may display the avatar 56a of the first viewer user together with the character object 51. In response to receiving the feature request from the first viewer user, the display request processing unit 21j may inquire the distributer user as to whether the avatar 56a of the first viewer user is allowed to be displayed together with the character object 51. When receiving the feature request from the first viewer user, the display request processing unit 21j may generate a list of display request users including the first viewer user and present the list of display request users to the distributor user. The list of display request users for a video shows a list of information identifying the users who have made the feature request (or their avatars) (for example, their user ID, user name, nickname, avatar ID or any other information). The list of display request users may not include all of the users who have transmitted the feature request. For example, the list of display request users may include, from among the users who have transmitted the feature request, only the users using avatars for which the 3D display information has been already loaded. In this case, the list of display request users does not include, from among the users who have transmitted the feature request, the information identifying the users using avatars for which the 3D display information has not been loaded. In order to three-dimensionally display the avatars for which the 3D display information has not been loaded, the 3D display information needs to be runtime-loaded. This enormously consumes the processing resources of the server device 20. The runtime loading can be avoided since the list of display request users includes only the users using avatars for which the 3D display information has been loaded.

The display request processing unit 21j can transmit the list of display request users to the supporter computer 40. The supporters B1 and B2 can select a user using an avatar who is approved of being displayed together with the character object from the list of display request users displayed on the display of the supporter computer 40. The list of display request users may be displayed on the display 39 in the studio room R. The actor A1 may select a user who uses the avatar to be displayed together with the character object 51, from the list of display request users, by manipulating the controller 33*a* or 33*b*. The user selected from the list of display request users is now given a permission that his/her avatar can be displayed together with the character object 51, and the avatar is featured in the video.

In one embodiment, if a user is selected from the list of display request users, the selected user may be deleted from the list of display request users. In another embodiment, if featuring of the avatar of a user is terminated, the user may be deleted from the list of display request users. In this manner, after an avatar is featured once, the avatar can be prohibited from being repeatedly featured.

In one embodiment, while a user is being featured, a supporter or distributer user may issue an instruction to select a to-be-featured user from the list of display request users. In this case, however, the avatar of the selected user may not be immediately featured. In addition, the selected user may not be deleted from the list of display request users until the featuring of the selected user's avatar is performed.

Figure 8:
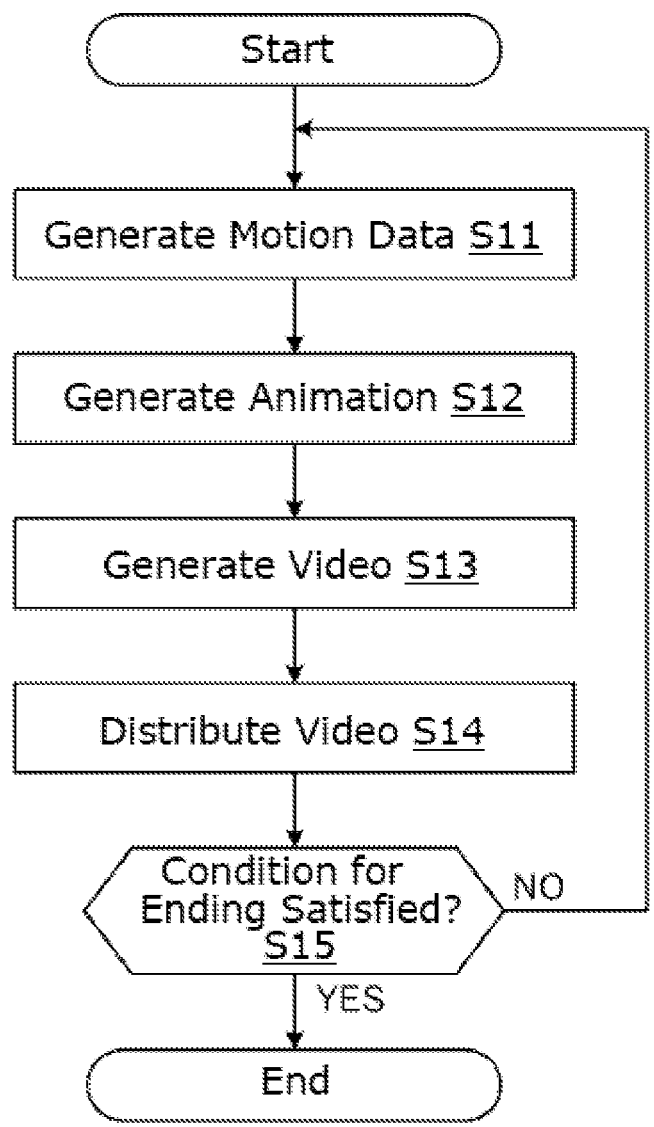
FIG. 8 is a flow chart showing a flow of a video distribution process in one embodiment.

Next, with reference to FIG. 8, a video distribution process in one embodiment will be described. FIG. 8 is a flow chart showing the flow of the video distribution process in one embodiment. In the video distribution process, it is assumed that the actor A1 is present in the studio room R.

First, in a step S11, the body motion data, which is a digital representation of the body motions of the actor A1, and the face motion data, which is a digital representation of the facial motions (facial expression) of the actor A1, are generated. The generation of the body motion data is performed, for example, by the body motion data generation unit 21*a* described above, and the generation of the face motion data is performed, for example, by the face motion data generation unit 21*b* described above.

Next, in a step S12, the body motion data and face motion data of the actor A1 are applied to the model data for the actor A1 to generate an animation of a character object that moves in synchronization with the body and face motions of the actor A1. The generation of the animation is performed, for example, by the above-described animation generation unit 21*c*.

In the next step S13, a video including the image of the virtual space and the animation of the character object corresponding to the actor A1 is generated. The voices of the actor A1 may be included in the video. The animation of the character object corresponding to the actor A1 may be provided in the virtual space. The generation of the video is performed, for example, by the above-described video generation unit 21*d*.

Next, the process proceeds to a step S14 where the video generated in the step S13 is distributed. The video is distributed to the client devices 10*a* to 10*c* and other client devices over the network 15. The video may be distributed to the supporter computer 40 and/or may be projected on the screen S in the studio room R. The video is distributed continuously over a predetermined distribution period. The distribution period of the video may be set to, for example, 30 seconds, 1 minute, 5 minutes, 10 minutes, 30 minutes, 60 minutes, 120 minutes, and any other length of time.

Subsequently in the step S15, it is determined whether a termination condition for ending the distribution of the video is satisfied. The termination condition is, for example, that the distribution ending time has come, that the supporter computer 40 has issued an instruction to end the distribution, or any other conditions. If the termination condition is not satisfied, the steps S11 to S14 of the process are repeatedly executed, and the video including the animation synchronized with the movements of the actor A1 continues to be distributed. If it is determined that the termination condition for the video is met, the distribution process of the video is ended.

Figure 9:
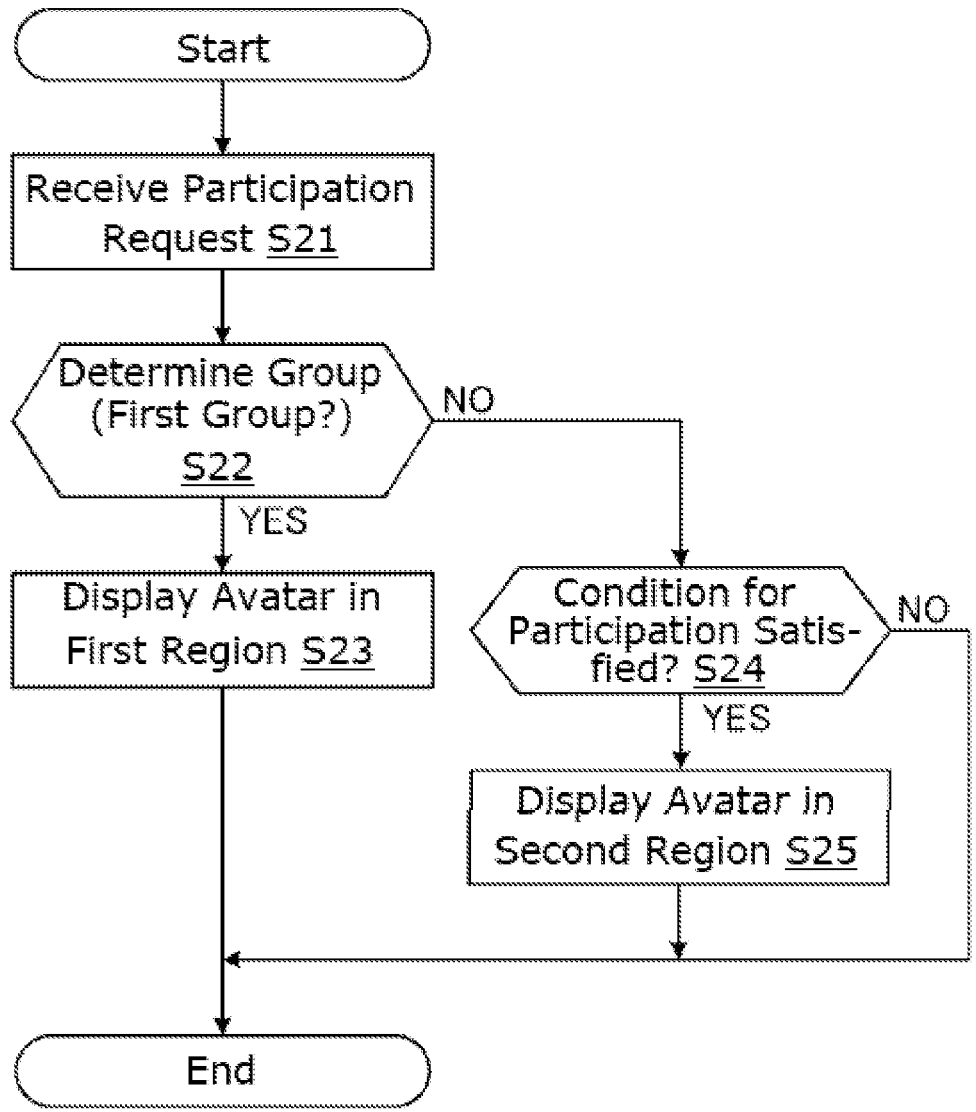
FIG. 9 is a flow chart showing a flow of a procedure of processing a participation request made by an avatar in one embodiment.

Next, with reference to FIG. 9, a participation request process in one embodiment will be described. FIG. 9 is a flow chart showing the flow of the participation request process in one embodiment. The participation request process shown in FIG. 9 assumes that the first viewer user watching the video on the client device 10*a* requests that the avatar 56*a* of the first viewer user participate in the video.

In the initial step S21, a participation request is received from the first viewer user. The participation request is transmitted from the client device 10*a* to the server device 20 when the first viewer user selects the avatar participation button 63 displayed on the client device 10*a*.

Subsequently, a step S22 identifies a group to which the user who has transmitted the participation request belongs. In a case where every user belongs to either the first or second group, it is determined which one of the first and second groups the first viewer user who has transmitted the participation request belongs to. The determination is made by, for example, the participation request processing unit 21*g* described above.

If it is determined that the first viewer user belongs to the first group, the participation request process proceeds to a step S23. In the step S23, the avatar 56*a* of the first viewer user is arranged in the first region 52*a* within the virtual space 50. As a result, when the first region 52*a* is included within the rendering regions of the virtual cameras, the avatar 56*a* of the first viewer user appears in the video at a position corresponding to the first region 52*a*. The avatar 56*a* is arranged in the first region 52*a* by, for example, the participation request processing unit 21*g* described above.

If it is determined that the first viewer user belongs to the second group, the participation request process proceeds to a step S24. In the step S24, it is determined whether the condition for participation is satisfied. As described above, the condition for participation is defined such that the number of avatars arranged in the second region 52*b* is less than the second upper limit defined for the second region 52*b*, that the first viewer user is selected by the distributor user or the like. The determination as to whether the condition for participation is satisfied is made by, for example, the participation request processing unit 21*g* described above.

If it is determined that the condition for participation is satisfied, the participation request process proceeds to a step S25. In the step S25, the avatar 56*a* of the first viewer user is arranged in the second region 52*b* within the virtual space 50. As a result, when the second region 52*b* is included within the rendering regions of the virtual cameras, the avatar 56*a* of the first viewer user appears in the video at a position corresponding to the second region 52*b*. The avatar 56*a* is arranged in the second region 52*b* by, for example, the participation request processing unit 21*g* described above.

If it is determined that the condition for participation is not satisfied, the avatar 56*a* of the first viewer user is not displayed and the participation request process ends. In another embodiment, if it is determined that the condition for participation is not satisfied, whether the condition for participation is satisfied may be repeatedly determined.

Figure 10:
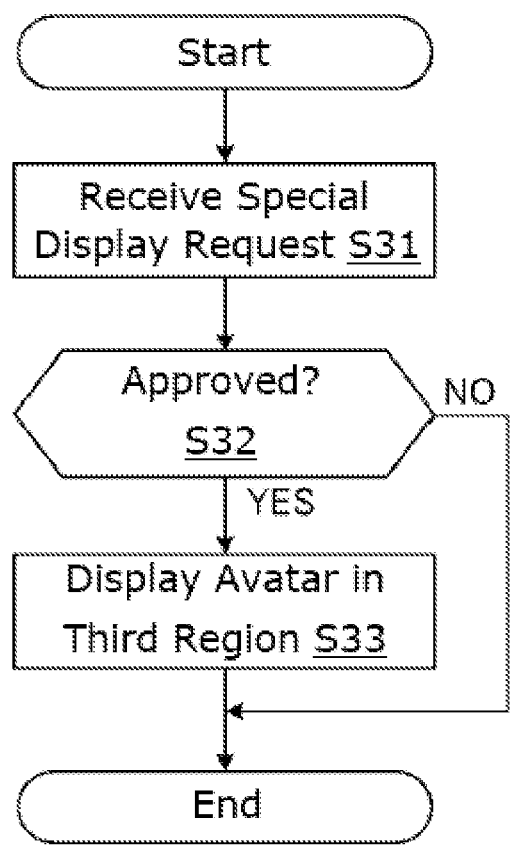
FIG. 10 is a flow chart showing a flow of a procedure of processing a display request made by an avatar in one embodiment.

Next, with reference to FIG. 10, a display request process in one embodiment will be described. The display request process is a process of displaying the avatar arranged in the virtual space together with the character object 51 (featuring the avatar) based on a display request (feature request) from the user of the avatar. FIG. 10 is a flow chart showing the flow of the display request process in one embodiment. The display request process shown in FIG. 10 assumes that the first viewer user watching the video on the client device 10a makes a display request to request that the avatar 56a of the first viewer user be displayed together with the character object 51.

In a step S31, a display request is received from the first viewer user. The display request is transmitted from the client device 10a to the server device 20 when the first viewer user selects the display request button 64 displayed on the client device 10a.

In the next step S32, it is determined whether the display request from the first viewer user is permitted by the distributer user. If it is determined that the permission is given, the display request process proceeds to a step S33. The determination is made by, for example, the display request processing unit 21j described above.

In the step S33, operations are performed to display the avatar 56a of the first viewer user together with the character object 51. For example, the avatar 56a is arranged on the floor object 54a, on which the character object 51 is arranged. The avatar 56a is arranged on the floor object 54a by, for example, the display request processing unit 21j described above.

If it is determined that the distributor user does not give the permission, the avatar 56a of the first viewer user is not displayed together with the character object 51 and the display request process ends. In another embodiment, the determining step S32 may be repeatedly performed until the distributer user gives the permission.

Figure 11:
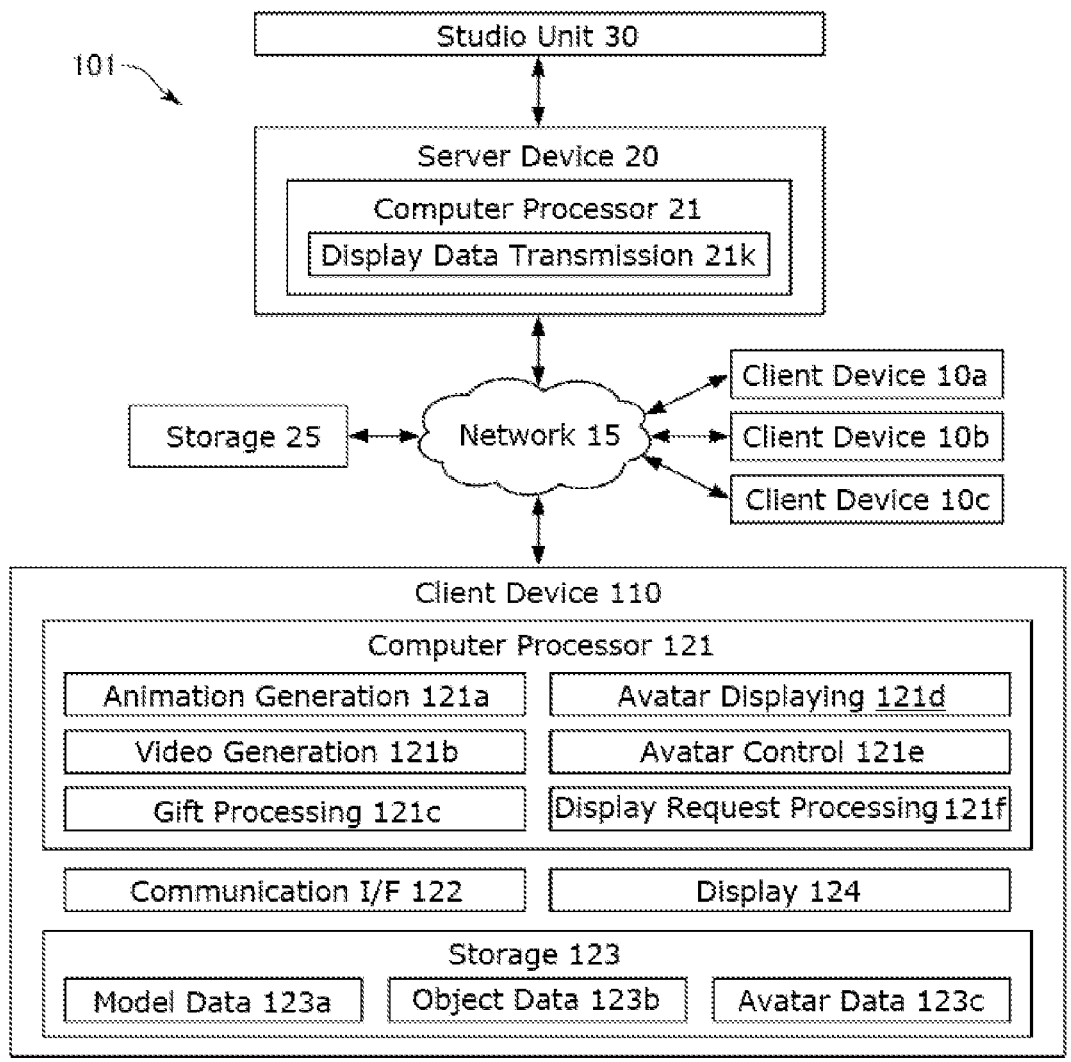
FIG. 11 is a block diagram illustrating a video distribution system in another embodiment.

Next, a video distribution system 101 according to another embodiment of the invention will be described with reference to FIG. 11. The video distribution system 101 includes the server device 20 and a client device 110. In the video distribution system 101, the client device 110 generates (renders) a video (video frames) based on the data received from the server device 20. In order to enable the client device 110 to generate a video, the server device 20 includes a display data transmission unit 21k for transmitting display data required by the client device 110 to generate a video. Although not illustrated for the purpose of simplifying the drawings, the service device 20 of the video distribution system 101 may be capable of providing not only the display data transmission unit 21k but also the same functions as the service device 20 of the video distribution system 1. The display data has a smaller data size than the video frames to be generated based on the display data. In the video distribution system 101, it is not the rendered video frames but the display data that is transmitted from the server device 20 to the client device 110. In this case, since the rendering is performed in the client device 110, the communication load can be reduced. In addition, since the communication load is reduced, the video distribution system 101 can achieve less transmission delay.

The display data transmitted from the display data transmission unit 21k may include the body motion data of the actor generated by the body motion data generation unit 21a, the face motion data generated by the face motion data generation unit 21b, the object identification information identifying the objects constituting the virtual space, the avatar identification information identifying the avatar to be displayed, and the gift identification information identifying the gift to be displayed. The display data may include voice information representing the voice of the actor. The object identification information identifying an object may include coordinate information indicating the position of the object within the virtual space.

When the server device 20 receives a gifting request from the client device 10a of the viewer user, the display data transmission unit 21k can incorporate, into the display data, gift identification information identifying a gift object requested by the gifting request to be displayed.

The display data transmission unit 21k can incorporate, into the display data, avatar identification information identifying an avatar of a user who is approved by the participation request processing unit 21g of participating. In addition to the avatar identification information identifying the avatar, the display data transmission unit 21k may incorporate, into the display data, display position information indicating the position where the avatar is to be displayed in the virtual space. The display position information indicating the display position of the avatar may indicate one of the first and second regions 52a and 52b where the avatar is to be displayed.

When the server device 20 receives a gifting request from the client device 10a of the viewer user, the display data transmission unit 21k can incorporate, into the display data, gift identification information identifying a gift object requested by the gifting request to be displayed.

When the server device 20 receives from the viewer user a motion instruction request targeting the avatar, the display data transmission unit 21k can incorporate, into the display data, the received motion instruction request. In this case, the display data may include motion identification information identifying the motion indicated by the motion instruction request.

When the server device 20 receives from the viewer user the above-mentioned feature request, the display data transmission unit 21k can incorporate, into the display data, the received feature request. In this case, the display data may include viewer identification information identifying the viewer user who has issued the feature request or avatar identification information identifying the avatar of this viewer.

The client device 110 is configured to generate a video based on the display data received from the server device 20. The client device 110 is an information processing device, such as a smartphone, capable of generating a video based on the display data. Generating a video based on the display data may be referred to as rendering. The client device 110 includes a computer processor 121, a communication I/F 122, a storage 123 and a display 124. The client device 110 is able to transmit and receive data to and from other devices via the communication I/F 122. The display 124 includes a display panel and a touch-screen panel. The client device 110 displays the generated video on the display 124.

The computer processor 121 is a computing device which loads various programs realizing an operating system and various functions from the storage 123 or other storage into a memory unit and executes instructions included in the loaded programs. The above description about the computer processor 21 may also apply to the computer processor 121 to a maximum extent.

The storage 123 is a storage device accessible from the computer processor 121. The above description on the storage 23 also applies to the storage 123 to a maximum extent. The storage 123 stores thereon model data 123a, object data 123b, avatar data 123c and any other various information necessary to generate videos.

The model data 123a is model data for generating an animation of a character. The description on the model data 23a also applies to the model data 123a to a maximum extent. The model data 123a can include, for example, rig data indicating a skeleton of a character, and surface data indicating the shape or texture of the surface of the character.

The object data 123b includes asset data used for constructing a virtual space in the video. The description on the object data 23b also applies to the object data 123b to a maximum extent. For example, the model data 123b may include data used to display a gift object.

The avatar data 123c can include avatar identification information identifying the avatars used by the users and avatar display information used to display the avatars within the videos. The description on the avatar data 23d also applies to the avatar data 123c to a maximum extent.

The storage 123 may store therein programs (may be referred to as "a physics engine") for simulating physical phenomena in the virtual space. The computer processor 121 can simulate the physical phenomena in the virtual space by executing the physics engine.

The functions realized by the computer processor 121 will be now described more specifically. The computer processor 121 functions as an animation generation unit 121a, a video generation unit 121b, a gift processing unit 121c, an avatar displaying unit 121d, an avatar control unit 121e and a display request processing unit 121f by executing the computer-readable instructions included in the distribution program. At least some of the functions that can be realized by the computer processor 121 may be realized by a computer processor other than the computer processor 121.

The animation generation unit 121a is configured to generate an animation of a character object based on the display data received from the server device 20. As described above, the display data may include the body motion data and face motion data. The animation generation unit 121a can apply the body motion data and face motion data received in the form of the display data to predetermined model data included in the model data 123a, thereby generating an animation of a character object that moves in the virtual space and whose facial expression changes. More specifically, the animation generation unit 121a is capable of generating an animation of a character object whose body and face move in synchronization with the body and face motion of the actor A1 based on the body motion data and face motion data about the actor A1.

The video generation unit 121b constructs the virtual space using the object data 123b, and generates a video that includes the virtual space and the animation of the character object corresponding to the actor A1. More specifically, the video generation unit 121b generates a sequence of successive video frames including the virtual space and the animation of the character object. The objects constituting the virtual space may be identified based on the display data received from the server device 20. The objects constituting the virtual space may be arranged in the virtual space at the positions identified based on the display data. When the display data includes the voices of the actor A1, the video generation unit 121b can combine the voices with the generated video.

The gift processing unit 121c identifies a gift object to be displayed based on the gift identification information included in the display data and performs display operations determined by the identified gift object. The above description on the gift processing unit 21f also applies to the gift processing unit 121c to a maximum extent. For example, the gift processing unit 121c can display at least one of an effect object, a normal object and a decorative object, based on the gift identification information included in the display data. The gift processing unit 121c may execute the physics engine. For example, when the display data includes gift identification information identifying a normal object representing a stuffed bear, the gift processing unit 121c can simulate gravitational fall of the stuffed bear and display the normal object representing the stuffed bear moving in the simulated manner in the video.

The avatar displaying unit 121d performs operations to identify an avatar of a viewer user to be displayed based on the avatar identification information included in the display data and to display the identified avatar in the image. The display position of the avatar may be determined based on the display position information of the avatar included in the display data.

When the display data includes motion identification information, the avatar control unit 121e can control the avatar to move in the manner indicated by the motion identification information. The avatar can move based on the motion identification information, for example, jump, wave his/her hands, shake a cyalume and the like.

When the display data includes a feature request, the display request processing unit 121f can, based on the feature request, display the avatar of the viewer user who has issued the feature request in the video, together with the character object.

Voice information may be transmitted from the server device 20 to the client device 110, separately from the display data. In this case, the client device 110 may combine the voice information and display data, to generate a video.

As described above, the client device 110 can generate a video based on the display data transmitted from the server device 20 and display the generated video on the display 124. The user of the client device 110 can watch the video displayed on the display 124. The client device 110 can serve in a similar manner as the client devices 10a to 10c, or provide functions of enabling a user to interact with a character object in a video or distributor. For example, the client device 110 can provide functions of transmitting to the server device 20 a gifting request to give a gift, a participation request to request participation of its avatar in a video, and a feature request to request featuring of its avatar. The client device 110 can serve in a similar manner as the client devices 10a to 10c, or use a variety of services provided by the server device 20.

As used in the specification and claims of the present application, "distribution of a video," "live distribution of a video," "to distribute a video" and "to live distribute a video" mean one or both of a case where the video generated in the server device 20 is distributed or live distributed to the client device (for example, the client device 10) and a case where a video is generated in a client device (for example, the client device 110) based on the display data transmitted from the server device 20, unless otherwise construed from the context. As used in the specification and claims of the present application, "a distributed video" and "a live distributed video" mean one or both of a video generated and distributed by the server device 20 and a video generated by the client device 110 based on the display data transmitted from the server device 20, unless otherwise construed from the context. Stated differently, when "a video is distributed," the video may be generated by either the server device 20 or client device.

Advantageous effects of the embodiments described above will be now described. In one embodiment described above, the video distributed by the server device 20 may be watched by the first viewer user. When a participation request for the video is received from the first viewer user, it is determined which one of the first and second groups the first viewer user belongs to. In one embodiment, if the first viewer user is highly engaged with the video distribution system 1, 101 or the distributer user distributing the video being watched, the first viewer user is determined to belong to the first group. If the first viewer user is determined to belong to the first group, the avatar 56a of the first viewer user is arranged in the first region 52a of the virtual space 50. In one embodiment, if the first viewer user is determined to belong to the first group, no additional conditions may not be required and the avatar 56a of the first viewer user is arranged in the first region 52a. With such a design, the embodiment does not hinder the avatar of the highly engaged user belonging to the first group from participating in the video. In one embodiment, the number of users belonging to the first group can be limited to an appropriate number determined by the video being distributed, by appropriately setting the criteria for the first group. This can prevent a large number of avatars from being displayed in a video being distributed, thereby reducing the processing load of the server device 20.

In one embodiment, if the first viewer user is determined to belong to the second group, it is further determined whether the condition for participation is satisfied. If it is determined that the condition for participation is satisfied, the avatar 56a of the first viewer user is arranged in the second region 52b of the virtual space 50. In this manner, the number of avatars displayed in the second region 52b can be limited to an appropriate number by setting the condition for participation appropriately. As a result, the embodiment can reduce the processing load of the server device 20.

In one embodiment, the first region 52a is closer in the virtual space 50 to the character object 51 (or to the third region in which the character object is arranged) than is the second region 52b. Accordingly, the highly engaged viewer user can be arranged near the character object 51. In one embodiment, the virtual cameras 53a to 53e are arranged in the virtual space 50 to face the character object 51. This means that an avatar arranged in the first region 52a is more likely to be included in the rendering region of the virtual cameras than an avatar arranged in the second region 52b. As noted, in one embodiment, the avatar of the highly engaged user belonging to the first group can be arranged in the first region 52a so that it is more likely to be included in the rendering region.

In one embodiment, the condition for participation is defined such that the number of avatars displayed in the second region 52b is less than the upper limit imposed on the displayable number set for the second region 52b. In this manner, the number of avatars displayed in the second region 52b can be limited to the upper limit or less. As a result, the embodiment can reduce the processing load of the server device 20.

In one embodiment, the condition for participation is that the viewer user is selected by the distributor user. With such a design, an avatar of a viewer user favorable for the distributor user is allowed to participate in a video. As a result, a healthy community can be established and maintained via a distributed video.

In one embodiment, a motion instruction is issued targeting an avatar arranged in the virtual space 50 and received. The motion of the avatar is controlled based on the motion instruction. With such a design, a viewer user who has issued the motion instruction targeting the avatar can interact with a character included in the video and other viewer users participating in the video.

In one embodiment, while an avatar of a viewer user is arranged in the virtual space 50, a display request is received to request that the avatar be displayed together with the character object 51. If the display request is approved, the avatar is displayed in the third region where the character object 51 is arranged. With such a design, the viewer user can have a way of more intimately communicating with the character of the distributer user.

Embodiments of the disclosure are not limited to the above embodiments but various modifications are possible within a spirit of the invention. For example, capturing and generating the images of the video to be distributed may be performed in a site other than the studio room R. For example, capturing the images for generating the video to be distributed may be performed at an actor's home or a supporter's home. The client device 10, 110 may have a function of transmitting to a different communicating device images where the avatar 56a and the character object 51 are both displayed (for example, the image 60f). For example, the first viewer user can use the functions of the client device 10, 110 to distribute the images where the avatar 56a and the character object 51 are both displayed, through a social networking service included in the video service provided by the server device 20 or through a social networking service different from the video service provided by the server device 20.

The procedures described herein, particularly those described with a flowchart, are susceptible of omission of part of the steps constituting the procedure, adding steps not explicitly included in the steps constituting the procedure, and/or reordering the steps. The procedure subjected to such omission, addition, or reordering is also included in the scope of the present invention unless diverged from the purport of the present invention.

LIST OF REFERENCE NUMBERS 1,101 video distribution system

What is claimed is:

1. A system for causing a viewer user device of a viewer user to play a live video containing a virtual space and an animation of a character object generated based on one or more motions of a distributor user, the virtual space including a first region and a second region, the viewer user device operable to concurrently display the first region and the second region different from the first region, the system comprising:

one or more computer processors, wherein the one or more computer processors execute computer-readable instructions to:

receive, from the viewer user, a participation request that requests participation of the viewer user in the live video;

determine, based on the participation request being received and based on group information associated with the viewer user, whether the viewer user belongs to a first group or a second group, the group information indicating whether the viewer user belongs to the first group or the second group, the first group comprising first users determined to have a first level of engagement with a video distribution system and the second group comprising second users determined to have a second level of engagement with the video distribution system, wherein the first level of engagement is greater than the second level of engagement; and one of:
  determine that the viewer user belongs to the first group, and cause, based on the viewer user being determined to belong to the first group without determining a condition for participation being satisfied, a specific avatar of the viewer user to be displayed in the first region within the virtual space; and
  determine that (i) the viewer user belongs to the second group and (ii) the condition for participation has been satisfied, and cause, based on the viewer user being (i) determined to belong to the second group and (ii) the condition for participation being satisfied, the specific avatar of the viewer user to be displayed in the second region within the virtual space.

2. The system of claim 1, wherein, in the virtual space, the first region is closer to the character object than the second region.

3. The system of claim 1, wherein the condition for participation being satisfied comprises a number of avatars displayed in the second region and representing users other than the viewer user being less than an upper limit on a displayable number set for the second region.

4. The system of claim 1, wherein the condition for participation being satisfied comprises the viewer user being selected by the distributor user.

5. The system of claim 1, further comprising:
  a storage for storing avatar data used to display the specific avatar of the viewer user in the virtual space, wherein the specific avatar is caused to be displayed in the virtual space based on the avatar data read from the storage.

6. The system of claim 1, wherein the one or more computer processors executing the computer-readable instructions are further caused to:
  receive a motion instruction targeting the specific avatar displayed in the virtual space; and
  control motion of the specific avatar displayed in the virtual space based on the motion instruction.

7. The system of claim 1, wherein the one or more computer processors executing the computer-readable instructions are further caused to:
  receive a display request targeting the specific avatar while the specific avatar is displayed in the virtual space;
  determine that the display request has been approved; and
  cause the specific avatar to be displayed in a third region where the character object is displayed.

8. The system of claim 7, wherein the specific avatar is displayed in the third region based on the viewer user being selected by the distributor user after the display request targeting the specific avatar is received.

9. A method performed by one or more computer processors executing computer-readable instructions to cause a viewer user device of a viewer user to play a live video containing a virtual space and an animation of a character object generated based on one or more motions of a distributor user, the virtual space including a first region and a second region, the viewer user device operable to concurrently display the first region and the second region different from the first region, the method comprising:
  receiving, from the viewer user, a participation request that requests participation of the viewer user in the live video; and
  determining, based on the participation request being received and based on group information associated with the viewer user, whether the viewer user belongs to a first group or a second group, the group information indicating whether the viewer user belongs to the first group or the second group, the first group comprising first users determined to have a first level of engagement with a video distribution system and the second group comprising second users determined to have a second level of engagement with the video distribution system, wherein the first level of engagement is greater than the second level of engagement, and wherein the method further comprises one of:
    (A1) determining that the viewer user belongs to the first group, and
    (A2) causing, based on the viewer user being determined to belong to the first group without determining a condition for participation being satisfied, a specific avatar of the viewer user to be displayed in the first region within the virtual space; and
    (B1) determining that (i) the viewer user belongs to the second group and (ii) the condition for participation has been satisfied, and
    (B2) causing, based on (i) the viewer user being determined to belong to the second group and (ii) the condition for participation being determined to be satisfied, the specific avatar of the viewer user to be displayed in the second region within the virtual space.

10. A non-transitory computer-readable storage medium storing a video distribution program for causing a viewer user device of a viewer user to play a live video containing a virtual space and an animation of a character object generated based on a motion of a distributor user, the virtual space including a first region and a second region, the viewer user device operable to concurrently display the first region and the second region different from the first region, the video distribution program, when executed by one or more computer processors, effectuate operations comprising:
  receiving, from the viewer user watching the live video, a participation request that requests participation of the viewer user in the live video;
  determining, based on the participation request being received and based on group information associated with the viewer user, whether the viewer user belongs to a first group or a second group, the participation request requesting participation of the viewer user in the live video, the group information indicating whether the viewer user belongs to the first group or the second group, the first group comprising first users determined to have a first level of engagement with a video distribution system and the second group comprising second users determined to have a second level of engagement with the video distribution system, wherein the first level of engagement is greater than the second level of engagement, and wherein the operations further comprise one of:
    (A1) determining that the viewer user belongs to the first group, and;
    (A2) causing, based on the viewer user being determined to belong to the first group without determining a condition for participation being satisfied, a specific avatar of the viewer user to be displayed in the first region within the virtual space; and
    (B1) determining that (i) the viewer user belongs to the second group and (ii) the condition for participation has been satisfied, and (B2) causing, based on (i) the viewer user being determined to belong to the second group and (ii) the condition for participation being determined to be satisfied, the specific avatar of the viewer user to be displayed in the second region within the virtual space.

11. The system of claim 1, wherein user information of the viewer user specifies that the viewer user belongs to the first group based on a flag set in a user identifier of the viewer user.

12. The system of claim 11, wherein the participation request includes the user information of the viewer user.

13. The system of claim 1, wherein one or more presentation effects are displayed in relation to the specific avatar of the viewer user based on the specific avatar of the viewer user being caused to be displayed in the first region within the virtual space.

14. The system of claim 1, wherein one or more presentation effects are displayed in relation to the specific avatar of the viewer user based on the specific avatar of the viewer user being caused to be displayed in the second region within the virtual space.

15. The system of claim 1, wherein the one or more computer processors execute computer-readable instructions further to:
determine that the participation request has been approved; and
prevent the specific avatar of the viewer user from participating in other videos based on the participation request being approved.

16. The system of claim 1, wherein the one or more computer processors execute computer-readable instructions further to:
receive an exit request from the viewer user device, wherein manipulation of the viewer user device causes the exit request to be transmitted; and
perform a procedure to cause the viewer user to exit the live video based on the exit request being received.

17. The system of claim 1, wherein the participation request is transmitted by the viewer user device based on the viewer user device detecting that a region of a touch-screen panel of the viewer user device had been tapped.

18. The system of claim 1, wherein:
the first users of the first group satisfy a condition for being placed in the first group;
the second users of the second group do not satisfy the condition for being placed in the first group;
the first level of engagement is represented as an amount of points a first viewer user has, the first viewer user being one of the first users;
the second level of engagement is represented as an amount of points a second viewer user has, the second viewer user being one of the second users;
the condition for being placed in the first group being satisfied comprises the amount of points that the first viewer user or the second viewer user has is greater than or equal to a threshold amount of points; and
the viewer user being the first viewer user or the second viewer user.

19. The system of claim 18, wherein:
the amount of points of the first viewer user varies based on activities by the first viewer user associated with the system; and
the amount of points of the second viewer user varies based on activities by the second viewer user associated with the system.

20. The system of claim 19, wherein:
the activities by the first viewer user associated with the system includes one or more of (i) watching a video distributed by the system, (ii) distributing a video through the system, (iii) posting a comment, (iv) giving a gift to a different user, (v) logging in the system, (vi) starting an application software for watching videos through the system, (vii) sending messages to another user through a social networking service provided by the system, or (ix) receiving a positive evaluation another user; and
the activities by the second viewer user associated with the system includes one or more of (i) watching a video distributed by the system, (ii) distributing a video through the system, (iii) posting a comment, (iv) giving a gift to a different user, (v) logging in the system, (vi) starting an application software for watching videos through the system, (vii) sending messages to another user through a social networking service provided by the system, or (ix) receiving a positive evaluation another user.

* * * * *